US010268733B2

(12) United States Patent
Garg et al.

(10) Patent No.: US 10,268,733 B2
(45) Date of Patent: Apr. 23, 2019

(54) GROUPING RECOMMENDED SEARCH QUERIES IN CARD CLUSTERS

(71) Applicant: Facebook, Inc., Menlo Park, CA (US)

(72) Inventors: Avichal Garg, Palo Alto, CA (US); Ming Hua, Palo Alto, CA (US); Saurabh Prafulla Chakradeo, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 385 days.

(21) Appl. No.: 15/147,305

(22) Filed: May 5, 2016

(65) Prior Publication Data
US 2016/0246890 A1   Aug. 25, 2016

Related U.S. Application Data

(63) Continuation of application No. 14/258,989, filed on Apr. 22, 2014, now Pat. No. 9,367,629.
(Continued)

(51) Int. Cl.
*G06F 17/00* (2006.01)
*G06F 17/30* (2006.01)
(Continued)

(52) U.S. Cl.
CPC ........ *G06F 17/3053* (2013.01); *G06F 3/0482* (2013.01); *G06F 3/04842* (2013.01);
(Continued)

(58) Field of Classification Search
CPC ......... G06F 17/30867; G06F 17/30864; G06F 17/3053; G06F 17/3087; G06F 17/276
See application file for complete search history.

(56) References Cited

U.S. PATENT DOCUMENTS 6,539,232 B2   3/2003   Hendrey
6,957,184 B2   10/2005   Schmid
(Continued)

FOREIGN PATENT DOCUMENTS

CN   101180625 A   5/2008
CN   102239491   11/2011
(Continued)

OTHER PUBLICATIONS

U.S. Appl. No. 15/927,666, filed Mar. 21, 2018, Garg.
(Continued)

*Primary Examiner* — Truong V Vo
(74) *Attorney, Agent, or Firm* — Baker Botts L.L.P.

(57) ABSTRACT

In one embodiment, a method includes receiving, from a client system of a first user of a communication network, an input from the first user to access a card-stack interface, generating one or more card clusters from a plurality of cards, each card comprising a query referencing a query-domain associated with the communication network and zero or more query-filters for the query-domain, wherein each query-filter references one or more objects of the communication network, each card cluster comprising one or more cards from the plurality of cards, the cards being formed into card clusters based on a card-affinity between the cards, and sending, to the client system in response to the input from the first user, the card-stack interface for display to the first user, wherein the card-stack interface comprises one or more of the card clusters.

20 Claims, 12 Drawing Sheets

Related U.S. Application Data

(60) Provisional application No. 61/918,431, filed on Dec. 19, 2013.

(51) Int. Cl.

| | | |
|---|---|---|
| *H04L 29/08* | (2006.01) | |
| *H04L 29/06* | (2006.01) | |
| *G06Q 50/00* | (2012.01) | |
| *G06F 3/0482* | (2013.01) | |
| *G06F 3/0484* | (2013.01) | |

(52) U.S. Cl.
CPC .. *G06F 17/30554* (2013.01); *G06F 17/30598* (2013.01); *G06F 17/30637* (2013.01); *G06F 17/30643* (2013.01); *G06F 17/30651* (2013.01); *G06F 17/30699* (2013.01); *G06F 17/30705* (2013.01); *G06F 17/30867* (2013.01); *G06F 17/30958* (2013.01); *G06Q 50/01* (2013.01); *H04L 67/02* (2013.01); *H04L 67/10* (2013.01); *H04L 67/42* (2013.01)

(56) References Cited

U.S. PATENT DOCUMENTS

| | | |
|---|---|---|
| 7,539,697 B1 | 5/2009 | Akella |
| 7,752,326 B2 | 7/2010 | Smit |
| 7,779,032 B1 | 8/2010 | Garfinkel |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Smit |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,402,094 B2 | 3/2013 | Bosworth |
| 8,407,200 B2 | 3/2013 | Wable |
| 8,412,749 B2 | 4/2013 | Fortuna |
| 8,538,960 B2 | 9/2013 | Wong |
| 8,539,359 B2 | 9/2013 | Rapaport |
| 8,572,129 B1 | 10/2013 | Lee |
| 8,595,297 B2 | 11/2013 | Marcucci |
| 8,601,027 B2 | 12/2013 | Behforooz |
| 8,620,021 B2 | 12/2013 | Knudson |
| 8,676,937 B2 | 3/2014 | Rapaport |
| 8,700,540 B1 | 4/2014 | Rapaport |
| 8,719,298 B2 | 5/2014 | Konig |
| 8,738,436 B2 | 5/2014 | Tuladhar |
| 8,949,250 B1 | 2/2015 | Garg |
| 9,367,629 B2 | 6/2016 | Garg |
| 9,460,215 B2 | 10/2016 | Garg |
| 2001/0043729 A1 | 11/2001 | Giger |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2005/0216300 A1 | 9/2005 | Appelman |
| 2006/0136419 A1 | 6/2006 | Brydon |
| 2006/0224554 A1 | 10/2006 | Bailey |
| 2007/0174304 A1 | 7/2007 | Shrufi |
| 2007/0277100 A1 | 11/2007 | Sheha |
| 2008/0021870 A1 | 1/2008 | Birnbaum |
| 2008/0040475 A1 | 2/2008 | Bosworth |
| 2008/0214166 A1* | 9/2008 | Ramer .................. G06Q 30/02 455/414.3 |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0216773 A1 | 8/2009 | Konopnicki |
| 2009/0228296 A1 | 9/2009 | Ismalon |
| 2009/0281988 A1 | 11/2009 | Yoo |
| 2009/0287682 A1 | 11/2009 | Fujioka |
| 2009/0299963 A1 | 12/2009 | Pippori |
| 2009/0327417 A1 | 12/2009 | Chakra |
| 2010/0070448 A1 | 3/2010 | Omoigui |
| 2010/0100546 A1 | 4/2010 | Kohler |
| 2010/0146012 A1 | 6/2010 | Beaudreau |
| 2010/0205541 A1 | 8/2010 | Rapaport |
| 2010/0235354 A1 | 9/2010 | Gargaro |
| 2010/0280860 A1 | 11/2010 | Iskold |
| 2011/0078166 A1 | 3/2011 | Oliver |
| 2011/0087534 A1 | 4/2011 | Strebinger |
| 2011/0173176 A1 | 7/2011 | Christensen |
| 2011/0182482 A1 | 7/2011 | Winters |
| 2011/0191371 A1 | 8/2011 | Elliott |
| 2011/0196855 A1 | 8/2011 | Wable |
| 2011/0270824 A1 | 11/2011 | Morris |
| 2011/0289063 A1 | 11/2011 | Radlinski |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0290562 A1 | 11/2012 | Wable |
| 2012/0290950 A1 | 11/2012 | Rapaport |
| 2012/0311034 A1 | 12/2012 | Goldband |
| 2013/0031106 A1 | 1/2013 | Schechter |
| 2013/0036114 A1 | 2/2013 | Wong |
| 2013/0041876 A1 | 2/2013 | Dow |
| 2013/0066876 A1 | 3/2013 | Raskino |
| 2013/0086057 A1 | 4/2013 | Harrington |
| 2013/0123018 A1 | 5/2013 | Sareli |
| 2013/0124538 A1 | 5/2013 | Lee |
| 2013/0124542 A1 | 5/2013 | Lee |
| 2013/0144899 A1 | 6/2013 | Lee |
| 2013/0173633 A1 | 7/2013 | Piepgrass |
| 2013/0191372 A1 | 7/2013 | Lee |
| 2013/0191416 A1 | 7/2013 | Lee |
| 2013/0246404 A1 | 9/2013 | Annau |
| 2014/0152541 A1* | 6/2014 | Murarka .............. G06F 3/0488 345/156 |
| 2015/0178397 A1 | 6/2015 | Garg |
| 2016/0335270 A1 | 11/2016 | Garg |

FOREIGN PATENT DOCUMENTS

| | | |
|---|---|---|
| JP | 2012-511208 A | 5/2012 |
| KR | 20110055144 A | 5/2011 |
| WO | WO 2001/018739 A1 | 3/2001 |
| WO | WO 2006/110480 A1 | 10/2006 |
| WO | WO 2012/088591 A1 | 7/2012 |
| WO | WO 2013/003079 A2 | 1/2013 |
| WO | WO 2013/066609 A1 | 10/2013 |

OTHER PUBLICATIONS

Extended European Search Report for Application No. 17169010.0-1871, dated Jul. 3, 2017.
The State Intellectual Property Office of the People's Republic of China Notification of the Second Office Action for Application No. 2014800695367 (with translation, comments and search report), dated Jun. 27, 2017.
Office Action and Examination Search Report of the Canadian Intellectual Property Office for Application No. 2,932,063, dated Jul. 12, 2016.
Examination Report No. 1 for AU Application No. 2017200893, dated Apr. 12, 2018.
EP Communication received from EPO for Patent Application No. 1716910.0-1217, dated Jul. 2, 2018.

(56) References Cited

OTHER PUBLICATIONS

Decision of Rejection of Japanese Patent Application No. 2017-009321 (with translation), dated Jan. 16, 2018.
Notification of Reasons for Rejection of Japanese Patent Application No. 2017-009321 (with English translation), dated Nov. 7, 2017.
Int'l Search Report and Written Opinion for Int'l App. PCT/US2014/035135, dated Sep. 30, 2014.
European Patent Office Extended Search Report for Application No. 14176343.3-1951, dated May 7, 2015.
U.S. Appl. No. 14/258,821, filed Apr. 22, 2014, Garg.
U.S. Appl. No. 14/258,989, filed Apr. 22, 2014, Garg.
U.S. Appl. No. 14/529,001, filed Apr. 22, 2014, Garg.
U.S. Appl. No. 14/568,642, filed Dec. 12, 2014, Garg.
Notification of Reasons for Rejection of Japanese Patent Application No. 2016-541207 (with English translation), dated Nov. 15, 2016.
Fikadu, et al., "A Framework for Personalized Information Retrieval Model," Conference Proceedings, Second International Conference on Computer and Network Technology (ICCNT), IEEE, Piscataway, NJ, USA, pp. 500-505, XP031682297, dated Apr. 23, 2010.
International Search Report for International Application No. PCT/US2012/060212, dated Mar. 26, 2013.
International Search Report for International Application No. PCT/CA2011/001403, dated Apr. 5, 2012.
U.S. Appl. No. 15/222,072, filed Jul. 28, 2016, Garg.
State Intellectual Property Office of the People's Republic of China, Notification of the First Office Action for Application No. 2014800695367, dated Jan. 4, 2017.
Korean Intellectual Property Office Notice of Allowance for Application No. 10-2016-7019611 (with English translation), dated Aug. 23, 2016.
Australian Government Patent Examination Report No. 1 for AU Patent No. 2014367225, dated Aug. 8, 2016.
European Patent Office Communication Report for Application No. 14176343.3-1951, dated Jul. 13, 2016.
KR Office Action received from KIPO for Patent Application No. 10-2016-7031884. (with English Translation), dated Oct. 22, 2018.
EP Communication received from EPO for Patent Application No. 1716910.0-1217, dated Sep. 25, 2018.

* cited by examiner

GROUPING RECOMMENDED SEARCH QUERIES IN CARD CLUSTERS

PRIORITY

This application is a continuation under 35 U.S.C. § 120 of U.S. patent application Ser. No. 14/258,989, filed 22 Apr. 2014, which claims the benefit, under 35 U.S.C. § 119(e), of U.S. Provisional Patent Application No. 61/918,431, filed 19 Dec. 2013, which is incorporated herein by reference.

TECHNICAL FIELD

This disclosure generally relates to social graphs and performing searches for objects within a social-networking environment or related environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may generate structured queries that include references to particular social-graph elements. These structured queries may be generated, for example, in response to a text query provided by a user, or generated as default queries. By providing suggested structured queries to a user's text query, the social-networking system may provide a powerful way for users of an online social network to search for elements represented in a social graph based on their social-graph attributes and their relation to various social-graph elements.

In particular embodiments, the card stack may be visual model indicating which applications or content of an application are being executed on a computing device. The card stack may have a card that is analogous to the launcher that displays all applications installed on the computing device. In particular embodiments, the user may access the card corresponding to the launcher by performing a gesture, such as for example swiping down from top, or pressing the "home" button of the computing device. Applications executed on the computing device or content of the applications (e.g. profile page of a user on a social network or tab of a web browser) may be displayed as a card stacked above the launcher card. In particular embodiments, the cards of the card stack may be ordered chronologically with the most recently executed applications being higher in the card stack. Each card may be accessed by swiping up on an exposed edge of the card or pulling down on the exposed edge of card depending on how the cards are stacked on the screen.

In particular embodiments, the social-networking system may generating "cards" with recommended queries and query filters using signals that may provide clues to the interests, preferences, or tastes of a given user. The social network may provide a user interface comprising one or more cards for display to the user. The idea is to generate cards that will be of interest of the user, and will cause the user to engage or further explore the social-networking system or other systems (e.g., systems associated with particular advertisers or other third-party systems). This may be particularly useful in the mobile context (e.g., bored users that want to go on FB mobile and explore cards). Each card may represent a particular domain (places, people, photos, etc.), with a recommended query associated with the card. One or more query filters may be applied to the recommended query of a card. For example, a places-card may have the filter options [location][type][sub-type][hours], which could be selected as ["Palo Alto"]["restaurants"] ["Chinese cuisine"]["open now"]. Some of the filters may be references to particular social-graph entities (e.g., like structured queries of objects within or without the social network), and some filters may be with respect to particular meta-data or object attributes.

In particular embodiments, the social-networking system may rank "cards" based on particular domains or filters associated with the cards. The social network may provide a user interface comprising one or more cards ranked in a way that is suitable for each user. The idea is to rank cards such that the most interesting cards will be presented to a user, causing the user to engage and further explore the social network. Each card may represent a particular domain (places, people, photos, etc.) with a recommended query (e.g., Graph Search query) and one or more filters to modify the query. Note that cards could be presented in any suitable manner, including as notifications, newsfeed stories, suggested null state queries, in a standalone application, on a home screen of a client system, or any other suitable way.

In particular embodiments, the social-networking system may cluster "hunch cards" based on affinity of the user to particular domains or filters associated with the cards. Each card may represent a particular domain (places, people, photos, etc.) with a recommended query (e.g., Graph Search query) and one or more filters to modify the query. The system may modify the filters on the card based on input/actions from the user. In other words, the user may navigate through cards to see cards with different filters. For example, swiping a card may reveal options to apply additional filters, or may show cards with variations of the recommended query on the prior card. The system may cluster cards in a way that is customized for each user by determining a card-to-card affinity and then clustering cards together based on this determined affinity. The goal is to cluster cards of interest to the user in a way that encourages the user to engage with or further explore the social network. By clustering cards that are related to each other, users may be presented with a more enjoyable card browsing experience.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

System Overview

Figure 1:
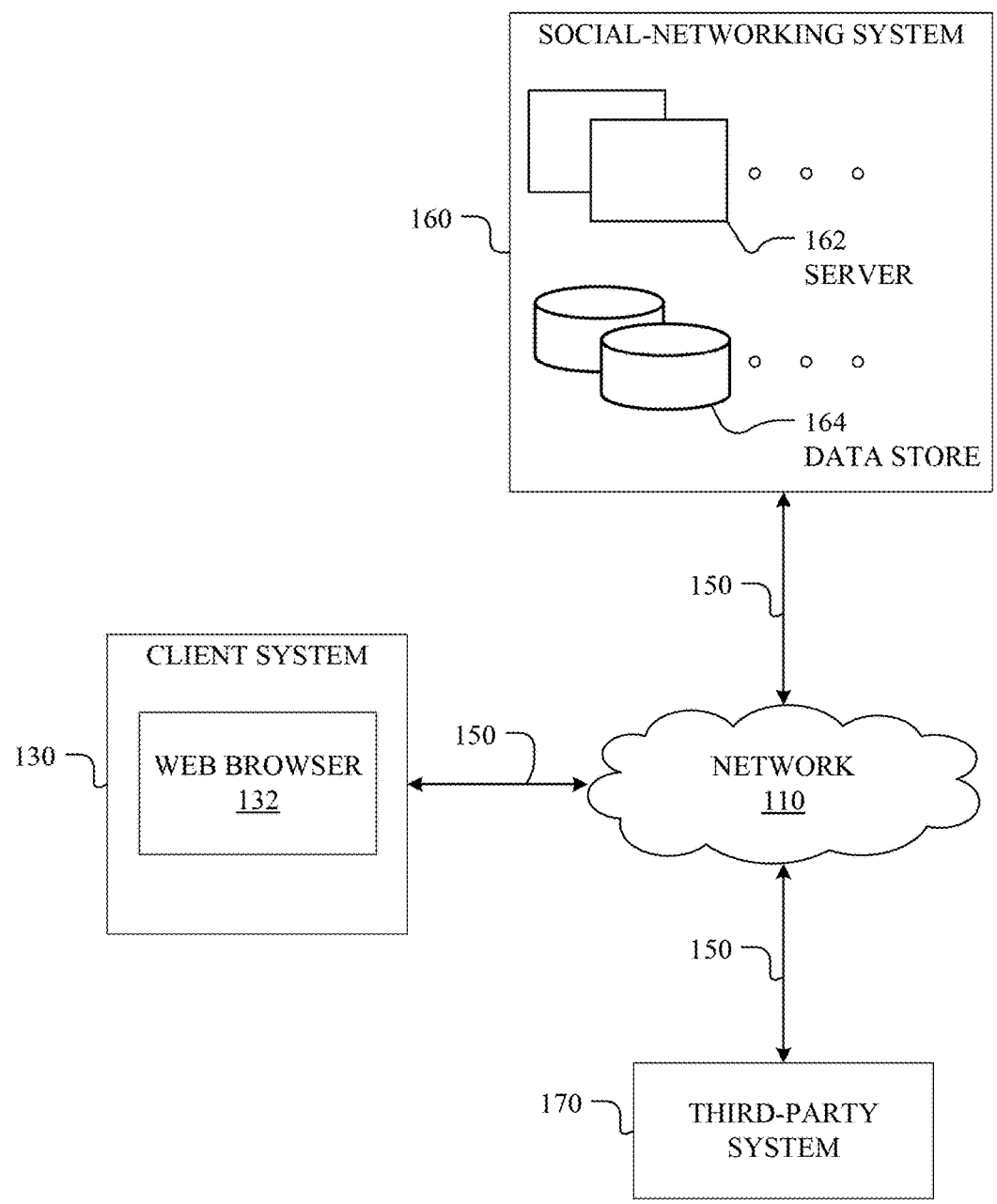
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable page files, including webpages or pages presented as a user interface of a native application. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
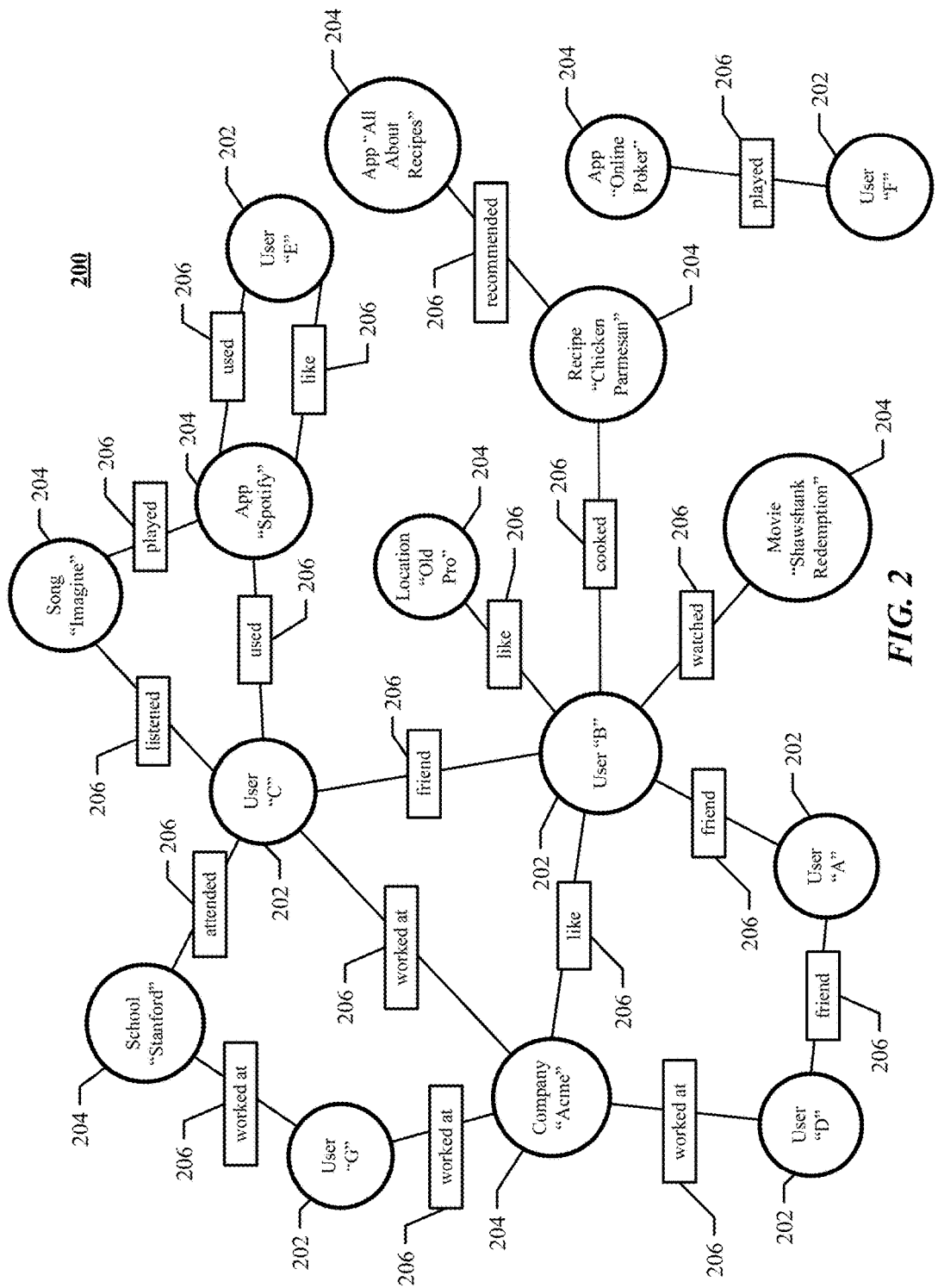
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more pages.

In particular embodiments, a node in social graph 200 may represent or be represented by a page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP code) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24.

In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Card-Stack Interfaces

Figure 3:
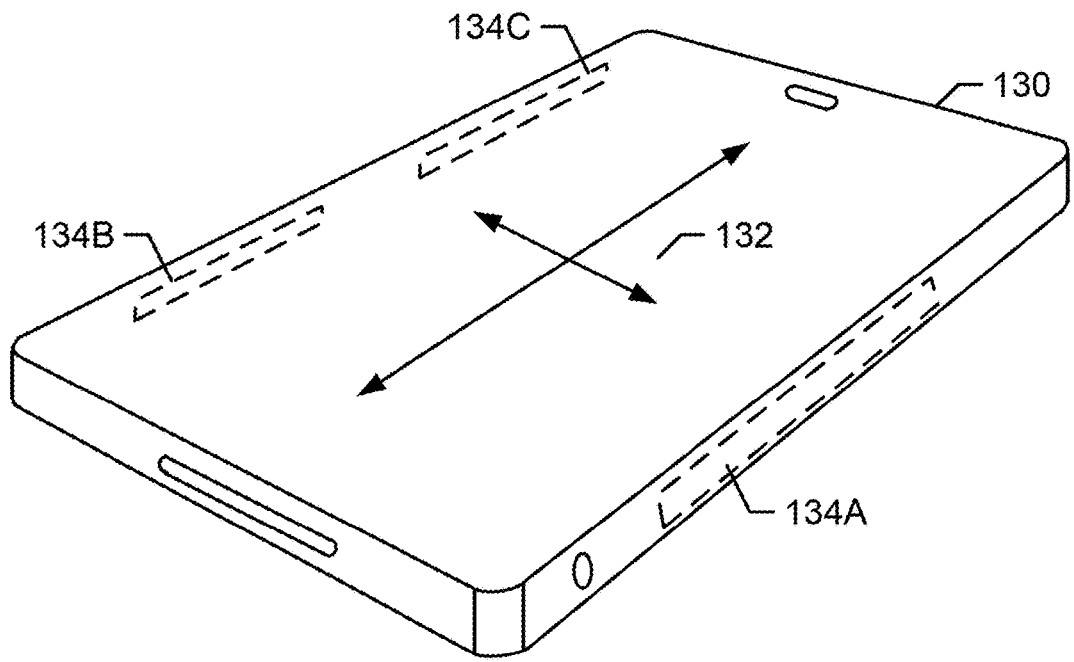
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-B may be incorporated into one or more sides of mobile client system 130. Antennae 134A-B are components that convert electric current into radio waves, and vice versa. During transmission of signals, a transmitter applies an oscillating radio frequency (RF) electric current to terminals of antenna 134A-B, and antenna 134A-B radiates the energy of the applied the current as electromagnetic (EM) waves. During reception of signals, antennae 134A-B convert the power of an incoming EM wave into a voltage at the terminals of antennae 134A-B. The voltage may be transmitted to a receiver for amplification.

In particular embodiments, mobile client system 130 many include a communication component coupled to antennae 134A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-B mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a predetermined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

In particular embodiments, a card-stack interface may be a visual model of a home screen and one or more applications or any content associated with an application executed on mobile client system 130, as described below. As an example and not by way of limitation, a home screen may be an application that may set one or more settings of mobile client 130, such as for example, the background image of mobile client system 130, or associate particular functions to particular applications installed on mobile client system 130, such as for example, the default web browser. In particular embodiments, mobile client system 130 may use the card-stack interface to navigate between a home screen and applications or content of the application, as described below. As an example and not by way of limitation, a card of the card-stack interface may correspond to the graphical user interface (GUI) of the home screen and may be provided for display on mobile client system 130 in response to a user pressing or actuating the "home" button, after using an application executed on mobile client system 130, or after completing a phone call on mobile client system 130. As described below, a card corresponding to an application or content of an application may be added to the card stack in response to "launching" or executing the application. In particular embodiments, the user of mobile client system 130 may navigate between applications and content of executed applications through the cards of the card-stack interface, as described below.

Figure 4:
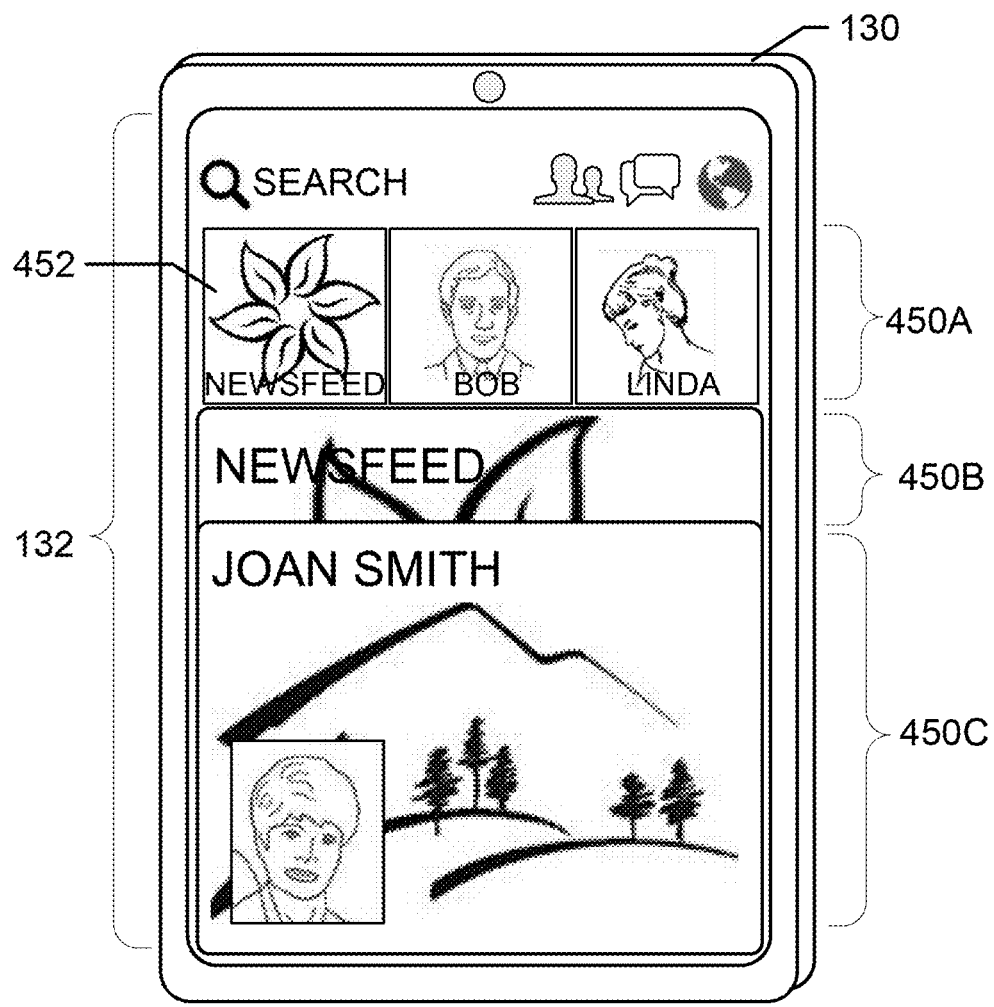
FIG. 4 illustrates an example card-stack interface.

FIG. 4 illustrates an example card-stack interface. One or more "cards" 450 of a card-stack interface (which includes cards 450A-C) may be displayed in display area 454 of mobile client system 130. In the example of FIG. 4, each card 450 may correspond to a GUI of an application or content associated with an application executed on mobile client system 130. In particular embodiments, card 450B of card-stack interface may correspond to the GUI of an application executed by mobile client system 130. As described above, card 450A in the card-stack interface may correspond to the GUI of a home screen of mobile client system 130. As an example and not by way of limitation, card 450A may correspond to the GUI of the home screen and may function as an application launcher of mobile client system 130. As an example and not by way of limitation, card 450A may be provided for display in response to actuating the "home" button or detecting a pre-determined touch input, such as for example, performing a downward swipe from substantially the top of display area 454. In particular embodiments, card 450A corresponding to the GUI of the home screen may include one or more interactive elements 452 corresponding to one or more applications or content installed on mobile client system 130. In particular embodiments, card 450A may be a visual representation of a linear transversal of interactive elements 452. As an example and not by way of limitation, interactive elements 452 may ordered from left to right in accordance with the application or content was launched. As another example, tapping an interactive element 652 may generate a card 650B-C associated with the interactive element 452.

In particular embodiments, one or more cards 450 that correspond to an application or content of an application being executed on mobile client system 130 may be displayed as card stack interface 450. In the example of FIG. 4, card 450B corresponds to the GUI of an application being executed on mobile client system 130 and card 450C corresponds to the GUI of content associated with the application being executed on mobile client system 130. In particular embodiments, card 450B may be provided for display in response to launching the application on mobile client system 130. In particular embodiments, one or more applications on mobile client system 130 may control presentation of their GUIs as cards 450C in card stack interface 450. Card 450C may be provided for display based at least in part on the settings of the application being executed. As an example and not by way of limitation, card 450B may correspond to the GUI of a social-networking system or web browser and content card 450C may correspond to a profile page of a user on the social-networking system or a tab of the web browser, respectively. The social-networking system or web browser may configure the card-stack interface to automatically display the GUI of particular content in one or more separate cards 450C. In particular embodiments, card 450C associated with content of an application may be provided for display in response to the user performing a pre-determined touch input, such as for example, a swipe touch-gesture or tapping a pre-determined location of the GUI of the application. In particular embodiments, the GUI of each card 450 may be depicted as a screenshot of the associated application or content of the associated application. Although this disclosure illustrates and describes a particular configuration of cards with particular characteristics and content, this disclosure contemplates any suitable configuration of cards with any suitable characteristics, such as for example, dimensions or appearance, and content. Moreover, this disclosure contemplates a card-stack interface implemented on any suitable computing device, such as for example, a personal computer, a tablet computer, or a smartphone.

In the example of FIG. 4, card 450B corresponding to the GUI of a launched application and a card 450C corresponding to the GUI of content associated with a launched application may overlay card 450A associated with the GUI of the home screen of mobile client system 130. As described above, opening a GUI of an application on mobile client system 130 may initiate adding card 450C corresponding to the GUI to card stack interface 450. In particular embodiments, card 450C may be placed on top of the card-stack interface when the application or content associated with card 450C is launched. In particular embodiments, an order of the cards in card stack 450 may be determined based at least in part on an order in which the GUIs corresponding to cards 450B-C were opened. As an example and not by way of limitation, cards 450B-C may be displayed in chronological order based on when the application was launched or the content associated with the application was separated or "popped out" from the application. As an example and not by way of limitation, application cards 450B and content cards 450C may be provided for display such that the most recently executed applications or content associated with an application are displayed higher up in the card stack.

In particular embodiments, the user of mobile client system 130 may navigate through cards 450 using a touch input detected by touch sensor of mobile client system 130. As an example and not by way of limitation, the user may navigate between cards 450 by swiping upward or pulling down an exposed edge of card 450 depending on how cards 450 are stacked on the display of mobile client system 130. Although this disclosure describes navigating through the cards using particular touch gestures, this disclosure contemplates navigation of the cards through any suitable user input, such as for example, actuating a button. In particular embodiments, the card-stack interface of mobile client system 130 may detect a user input to display a card, such as for example 450B, as the card on top of the card-stack interface and the card-stack interface may display the card on top of the card-stack interface in response to the user input. As an example and not by way of limitation, the card-stack interface may order of cards 450 in the card-stack interface by displaying cards 450B-C corresponding to more recently opened GUIs higher in the card-stack interface and cards 450B-C corresponding to less recently opened GUIs lower in the card-stack interface. In particular embodiments, cards 450 of the card-stack interface may be re-ordered in response to detecting powering down the display of mobile client system 130, a change of geo-location of mobile client system 130, a pre-determined movement detected through one or more sensors of mobile client system 130, one or more pre-determined touch gestures detected through the touch sensor of mobile client system 130, a change of network condition (e.g. loss of connectivity), a request for higher priority for one or more cards 450 received through an application programming interface (API), or any combination thereof. Although this disclosure describes re-ordering one or more cards of the card-stack interface based on particular criteria, this disclosure contemplates re-ordering of the cards of the card-stack interface based on any suitable criteria.

In particular embodiments, the user may interact with the application or content associated with card 450C on top of the card-stack interface. In the example of FIG. 4, card 450C may be a GUI corresponding to a profile page of a particular user on a social-networking system and the user of mobile client system 130 may interact with the profile page through card 450C corresponding to the GUI of the profile page. The user may then move card 450A corresponding to the GUI of the home screen of mobile client system 130 to the top of the card-stack interface and launch an application associated with one of interactive elements 452, such as for example, a newsfeed. After launching the newsfeed, the user may move card 450B associated with a social-networking system to the top of the card-stack interface and interact, for example, commenting on a status update of another user, with the social-networking system through card 450B corresponding to the GUI of the social-networking system.

Suggested Queries and Cards

Introduction

In particular embodiments, social-networking system 160 may be configured to generate personalized recommendations of objects that may be represented as a concept node of a social graph described above. Herein, reference to a suggested query may refer to a search query with one or more search terms auto-populated with information of the user. Herein, reference to a query-domain may refer to a logical grouping of content objects related to a particular category. Herein, reference to a query-filter may refer to a filter applied to a query-domain that references metadata or an attribute of objects of the query-domain. As an example and not by way of limitation, social-networking system 160 may generate a suggested query for a user as one or more structured queries, unstructured queries, or any combination thereof. As another example, social-networking system 160 may generate one or more cards that references one or more search results of the suggested query. Although this disclosure describes generating a suggested query in a particular manner, this disclosure contemplates generating the suggested query in any suitable manner.

Figure 5:
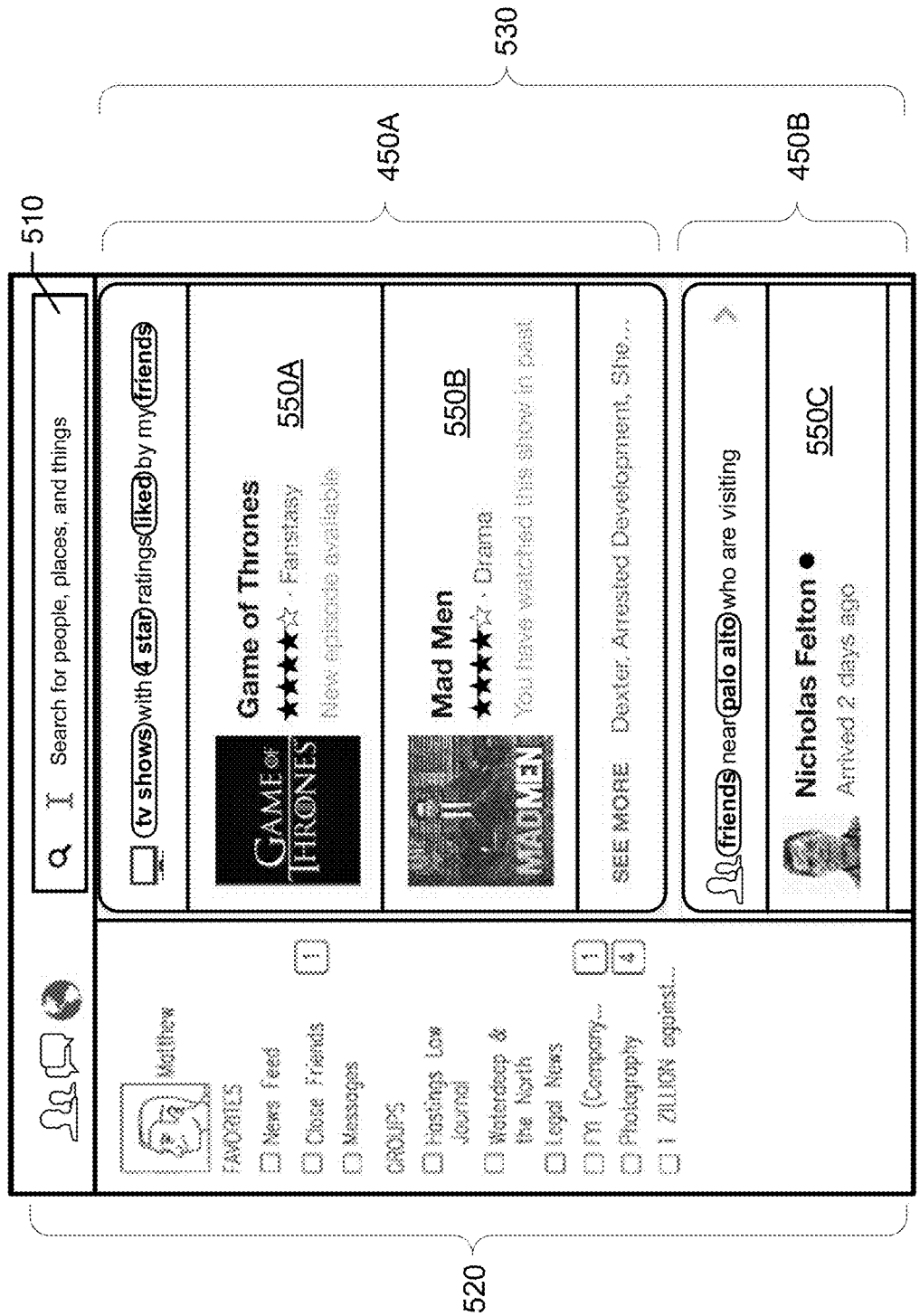
FIG. 5 illustrates an example page of an online social network.

FIG. 5 illustrates an example page of an online social network. To conduct a search, a user may input or send a search query to the search engine. In general, a user may input any character string into a search-query field 510 of a page 520 of social-networking system 160 to search for content on the social-networking system 160 that matches the text query. In particular embodiments, page 520 may present one or more card clusters 530 where each card 450 may correspond to a recommendation that are personalized to the user as described below. As an example and not by way of limitation, one or more card clusters 530 may be displayed on page 520 in response to the user clicking the cursor in search-query field 510. In particular embodiments, the application or page 520 may generate cards through a suggested query for the user that includes one or more search terms relevant to the user and automatically generated by social-networking system 160. Each card 450 may then include one or more search results 550 that correspond to the suggested query associated with the card 450. In particular embodiments, an initial card cluster 530 may include one or more cards 450 without any filtering as described below.

In particular embodiments, the suggested query may correspond to a phrase with one or more auto-populated search terms and may take the form of an unstructured text query. Social-networking system 160 may then search data store 164 (or, in particular, a social-graph database) to identify content that matches the suggested query. The search engine may conduct a search based on the suggested query phrase using various search algorithms and generate search results that identify resources or content (e.g., user-profile pages, content-profile pages, or external resources) that are most likely to be related to the suggested search query. In response, the search engine may identify one or more resources that are likely to be related to the suggested query, each of which may individually be referred to as a "search result," or collectively be referred to as the "search results" corresponding to the suggested query. The identified content may include, for example, social-graph elements (e.g., user nodes 202 or concept nodes 204), profile pages, external webpages, or any combination thereof. As described below, social-networking system 160 may then generate one or more card clusters 530 with one or more cards 450 corresponding to the identified content which may be sent to the user.

Figure 8:
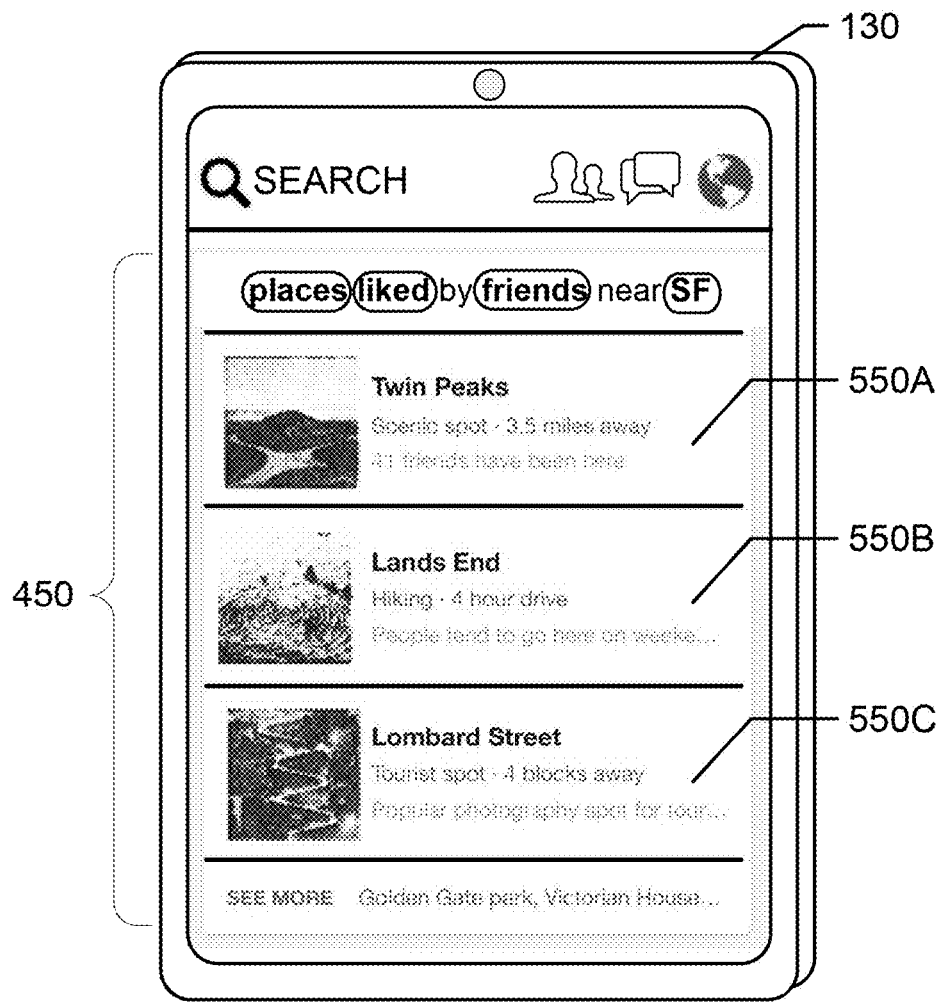
FIG. 8 illustrates an example wireframe of an example card interface on an example mobile client system.

As illustrated in the example of FIGS. 5 and 8, the results of the suggested query may be presented to the user, in the form of one or more cards 450, each card having one or more search results 550 that may include one or more links or hyperlinks, each link being associated with a different page that contains some of the identified resources or content. In particular embodiments, each link in cards 450 may be in the form of a Uniform Resource Locator (URL) that specifies where the corresponding page is located and the mechanism for retrieving it. The social-networking system 160 may then send the one or more cards 450 (e.g., as a card cluster 530) to the web browser 132 on the user's client system 130. The user may then click on the URL links or otherwise select the content of cards 450 to access the content from the social-networking system 160 or from an external system (such as, for example, a third-party system 170), as appropriate.

As described below, cards 450 of each card cluster 530 may be ranked and presented to the user according to their inferred relative degrees of relevance to the user. In other words, cards 450 may be personalized for the user based on, for example, social-graph information, user information, search or browsing history of the user, or other suitable information related to the user. In particular embodiments, the cards may be ranked (and thus personalized for a particular user) using a ranking algorithm. The ranking algorithm may be implemented by social-networking system 160 (for example, by the search engine or by another suitable system) in any suitable manner. As an example and not by way of limitation, cards that are more relevant to the user may be ranked higher than the cards that are less relevant to the user. In particular embodiments, the search engine may limit its search to resources and content on the online social network. However, in particular embodiments, the search engine may also search for resources or contents on other sources, such as a third-party system 170, the Internet or World Wide Web, or other suitable sources. Although this disclosure describes querying the social-networking system 160 in a particular manner, this disclosure contemplates querying the social-networking system 160 in any suitable manner.

In particular embodiments, one or more cards 450, or card clusters 530 displayed on page 520 may be modified in response to text entered into search-query field 510. In particular embodiments, one or more client-side and/or backend (server-side) processes may implement and utilize a "typeahead" feature that may automatically modify the suggested query to include terms relevant to the user and the text currently being entered by a user into search-query field 510. In particular embodiments, as a user is entering text into search-query field 510, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the suggested query with a reference to the social-graph element (such as, for example, the node name/type, node ID, edge name/type, edge ID, or another suitable reference or identifier) of the existing social-graph element. As an example and not by way of limitation, if a user types in "food" or "restaurants," one or more cards 450 may be displayed that incorporate some typeahead suggestions such as "Restaurants in . . . " while letting the user continue typing. Furthermore, a [Restaurants] card (e.g. 450) may be moved to the top of a card cluster 530 and one or more non-food related cards (e.g. 450), such as for example "What's on TV" may be hidden. The user may then navigate through one or more [Restaurant] cards as a personalized list of restaurant recommendations. More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a search-query field 510, a typeahead process may attempt to identify one or more user nodes 202, concept nodes 204, or edges 206 that match the string of characters entered into search-query field 510 as the user is entering the characters. As the typeahead process receives requests or calls including a string or n-gram from the text query, the typeahead process may perform or causes to be performed a modified suggested query to identify existing social-graph elements (i.e., user nodes 202, concept nodes 204, edges 206) based at least in part on the respective names, types, categories, or other identifiers matching the entered text along with information associated with the user. The typeahead process may use one or more matching algorithms to attempt to identify matching nodes or edges and process the modified suggested query that incorporates the identified nodes or edges. In response to the modified suggested query, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 14/052,536, filed 11 Oct. 2013, which are incorporated by reference.

Element Detection and Parsing Ambiguous Terms

As described above, in response to text entered into search-query field 510 by the user, the social-networking system 160 may identify portions of the text that may correspond to particular social-graph elements. However, in some cases the text entered into search-query field 510 may include one or more terms that are ambiguous, where an ambiguous term is a term that may possibly correspond to multiple social-graph elements. To parse the ambiguous term, the social-networking system 160 may access a social graph 200 and then parse the text to identify the social-graph elements that corresponded to ambiguous n-grams from the text query. The social-networking system 160 may then modify the suggested query to include one or more structured queries, where each structured query corresponds to one of the possible matching social-graph elements. These structured queries may be based on strings generated by a grammar model, such that they are rendered in a natural-language syntax with references to the relevant social-graph elements. In particular embodiments, these structured queries may be ranked based on information associated with user to infer from among the structured queries which social-graph element is most relevant to the user. The social-networking system 160 may then lock the ambiguous term in the text to the social-graph element inferred to be most relevant to user, and then generate a new set of structured queries based on the relevant social-graph element. Although this disclosure describes generating particular structured queries in a particular manner, this disclosure contemplates generating any suitable structured queries in any suitable manner.

As an example and not by way of limitation, the user may enter unstructured text "friends stanford" into search-query field 510. As the querying user enters this unstructured text into search-query field 510, the social-networking system 160 may modify the suggested query to include structured queries incorporating the unstructured text, as described above. In particular embodiments, social-networking system 160 the suggested query may take the form of one or more unstructured queries auto-populated to include information relevant to the user, such as for example current or user profile information, as described below. The text may, of course, be structured with respect to standard language/grammar rules (e.g. English language grammar). However, the text will ordinarily be unstructured with respect to social-graph elements. In other words, text entered into search-query field 502 may not ordinarily include embedded references to particular social-graph elements. Thus, as used herein, a structured query refers to a query that contains references to particular social-graph elements, allowing the search engine to search based on the identified elements. Furthermore, the text may be unstructured with respect to formal query syntax. In other words, the text may not necessarily be in the format of a query command that is directly executable by a search engine (e.g., the text query "friends stanford" could be parsed to form a suggested query command "intersect(school(Stanford University), friends (me)", or "/search/me/friends/[node ID for Stanford University]/students/ever-past/intersect", which could be executed as a suggested query in a social-graph database). With respect to cards 450, discussed below, social-networking system 160 may generate cards 450 that correspond to both typeahead query results and structured query results. As an example and not by way of limitation, social-networking system 160 may generate a first card 450 corresponding to the results of the typeahead process and second card 450 corresponding to the query "Friends Nearby," and a third card 450 corresponding to the results of the structured query "Friends Nearby who went to Stanford." These cards 450 may then be ranked and filtered as discussed below.

Although this disclosure describes receiving particular suggested queries in a particular manner, this disclosure contemplates receiving any suitable suggested queries in any suitable manner.

More information on element detection and parsing queries may be found in U.S. patent application Ser. No. 13/556,072, filed 23 Jul. 2012, U.S. patent application Ser.

No. 13/731,866, filed 31 Dec. 2012, and U.S. patent application Ser. No. 13/732,101, filed 31 Dec. 2012, each of which is incorporated by reference.

Generating Structured Search Queries

In particular embodiments, the social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. In particular embodiments, the social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and $N$ specify the terminal and non-terminal symbols, respectively, with $S \in N$ being the start symbol. P is the set of productions, which take the form $E \to \xi(p)$, with $E \in N$, $\xi \in (\Sigma \cup N)^+$, and $p = Pr(E \to \xi)$, the probability that E will be expanded into the string $\xi$. The sum of probabilities p over all expansions of a given non-terminal E must be one. Although this disclosure describes accessing particular grammars, this disclosure contemplates any suitable grammars. Furthermore, although this disclosure describes generating strings in a particular manner, this disclosure contemplates generating strings in any suitable manner.

In particular embodiments, the social-networking system 160 may generate a suggested query that may include one or more structured queries. The structured queries may be based on the natural-language strings generated by one or more grammars, as described previously. Each structured query may include references to one or more of the identified nodes or one or more of the identified edges 206. This type of structured query may allow the social-networking system 160 to more efficiently search for resources and content related to the online social network (such as, for example, profile pages) by searching for content connected to or otherwise related to the identified user nodes 202 and the identified edges 206. As an example and not by way of limitation, in response to the text in search-query field 510, "show me friends of my girlfriend," the social-networking system 160 may generate a suggested query that includes a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). Based on the results of the modified suggested query, social-networking system 160 may modify one or more cards 450 or card cluster 530A-B to incorporate, for example, the names (name strings) of the matching nodes. These structured queries may be pre-generated and accessed from a cache or generated dynamically in response to input from the user. Although this disclosure describes generating particular structured queries in a particular manner, this disclosure contemplates generating any suitable structured queries in any suitable manner.

In particular embodiments, social-networking system 160 may score the generated suggested queries. The score may be, for example, a confidence score, a probability, a quality, a ranking, another suitable type of score, or any combination thereof. The suggested queries may be scored based on a variety of factors, such as, for example, the page or type of page the user is accessing, user-engagement factors, business-intelligence data, the predicted click-thru rate (CTR) of particular suggested queries, the conversion-rate of particular suggested queries, user-preferences of the user, the search history of the user, advertising sponsorship of particular queries, the user's social-graph affinity for social-graph elements referenced in particular queries, the inferred intent of the user, the general or current popularity of particular suggested queries, the usefulness of particular suggested queries, the current geographic location of the user, the current time, other suitable factors, or any combination thereof. Although this disclosure describes ranking suggested queries in a particular manner, this disclosure contemplates ranking suggested queries in any suitable manner.

As described above, cards 450 corresponding to suggested queries may be displayed on a user-interface (UI) of a native application or on a webpage accessed by a browser client on the user's client system 130, as illustrated in FIG. 3. In particular embodiments, cards 450 corresponding to suggested queries may be presented to the user in a ranked order, such as, for example, based on a rank previously determined as described above. Furthermore, in particular embodiments, cards 450 corresponding to suggested queries above a threshold rank may be sent or displayed to the user. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Search Results

In particular embodiments, in response to a suggested query generated by a particular application or program, the social-networking system 160 may generate one or more search results, where each search result matches (or substantially matches) the terms of the suggested query. The social-networking system 160 may generate a suggested query based at least in part on information of the user corresponding to a user node 202. As described below, in response to the suggested query, the social-networking system 160 may generate one or more cards 450 corresponding to search results of the suggested query. In particular embodiments, cards 450 corresponding to the search results may be clustered or ranked and sent to the user as a page accessed by a browser client or a UI of a native application. Although this disclosure describes and illustrates displaying cards and card clusters on particular pages, this disclosure contemplates displaying cards and card clusters on any suitable pages.

In particular embodiments, the social-networking system 160 may generate one or more cards 450 corresponding to search results of the suggested query. Cards 450 may include information identifying resources or content (e.g., user-profile pages, content-profile pages, or external resources) that match or are likely to be related to the suggested query. In particular embodiments, each card 450 may correspond to a particular user node 202 or concept node 204 of social graph 200. Cards 450 may include a link to the profile page associated with the node, as well as contextual information about the node (i.e., contextual information about the user or concept that corresponds to the node). In particular embodiments, each search result may correspond to a node that is connected to one or more of the selected nodes by one or more of the selected edges of the suggested query. In particular embodiments, the social-networking system 160 may also transmit advertisements or other sponsored content to the client system 130 in response to the suggested query. The advertisements may be included in as part of cards 450, or separately. The advertisements may correspond to one or more of the objects referenced in cards 450. In particular embodiments, the social-networking system 160 may filter out one or more cards 450 identifying particular resources or content based on the privacy settings associated with the users associated with those resources or content. Although this disclosure describes generating particular cards corresponding to a suggested query in a particular manner, this disclosure contemplates generating any suitable cards corresponding to any suitable suggested query in any suitable manner.

More information on generating search results may be found in U.S. patent application Ser. No. 13/556,017, filed 23 Jul. 2012, U.S. patent application Ser. No. 13/731,939, filed 31 Dec. 2012, and U.S. patent application Ser. No. 14/052,564, filed 11 Oct. 2013, each of which is incorporated by reference.

Generating Cards with Suggested Queries

In particular embodiments, social-networking system 160 may generate and display recommendations in the form of cards 450 that are personalized or relevant to the user. In particular embodiments, one or more card stacks 530A-B may be sent to a user. Herein, reference to a filter-value may refer to metadata or attributes that describe particular characteristics of an object. Herein, reference to a user-engagement score may refer to a metric for measuring the engagement of a user of the online social network, such as, for example, by engaging with other users, concepts, content, etc. As an example and not by way of limitation, social-networking system 160 may generate one or more card stacks 530A-B that may be sent to the user as part of a null search state of a particular search page on social-networking system. As another example and not by way of limitation, social-networking system 160 may generate one or more card stacks 530A-B as part of a native application associated with social-networking system 160 executed on mobile client system 130. Although this disclosure describes generating personalized recommendations in a particular manner, this disclosure contemplates generating personalized recommendations in any suitable manner.

Figure 6:
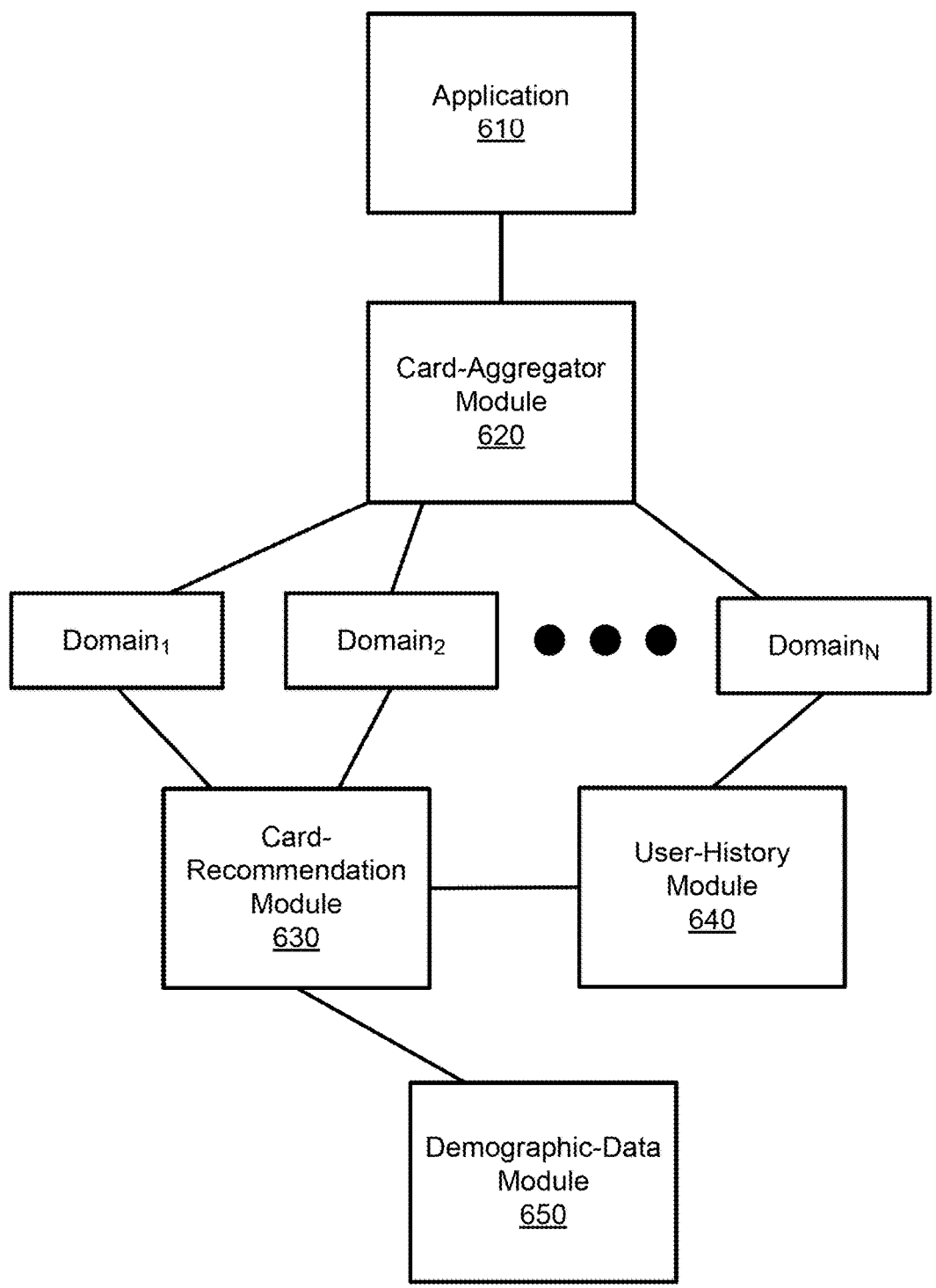
FIG. 6 illustrates example modules to generate example cards.

FIG. 6 illustrates example modules to generate example cards. Although FIG. 6 illustrates a particular configuration of particular modules that have particular functions, this disclosure contemplates any suitable configuration of modules of any suitable modules that may have any suitable function or combination of functions. As described above, social-networking system 160 may generate cards 450 based on information of the user, such as for example current location of the user or the time of day. In particular embodiments, an application 610 executed on a client system 130 or social-networking system 160 may send information of the user to a card-generation module 620. In particular embodiments, social-networking system 160 may use information associated with social graph 200, non-social graph information, or any combination thereof to generate one or more cards 450. As an example and not by way of limitation, geo-locations associated with "checked-ins" of the user may be a non-social graph of how users are connected to "places" or geo-locations, and how all of the places in the world are connected to each other through the users who have visited those geo-locations. In particular embodiments, application 610 may access current information associated with the user, such as for example, current location or time associated with the user. As an example and not by way of limitation, application 610 may determine the current location of the user through the location services of mobile client system 130 as described above. As another example, application 610 may determine the current location of the user through the Internet protocol (IP) or media access control (MAC) address of client system 130. In particular embodiments, the current information of the user accessed by application 610 may be sent to card-aggregator module 620. Card-aggregator module 620 may generate one or more suggested queries that then may be sent to domain modules $domain_1$-$domain_N$. Furthermore, card-aggregator module 620 may infer one or more search terms that may be auto-populated into the suggested query based on received information, such as for example the current location of the user or the time of day.

In particular embodiments, each domain module $domain_1$-$domain_N$ may correspond to a particular query-domain. As an example and not by way of limitation, each domain module $domain_1$-$domain_N$ may include a search index of a vertical of objects stored on social-networking system 160, as described below. The search index may be hosted by a respective index server comprising one or more computing devices (e.g., servers). As an example and not by way of limitation, the search index of each query-domain may reference objects associated with a particular type of place (e.g., a movie theater, restaurant, landmark, or city), a particular type of entity (e.g., a person, business, group, sports team, or celebrity), a particular type of resource (e.g., an audio file, video file, digital photo, text file, structured document, or application), or a particular type real or intellectual property (e.g., a sculpture, painting, movie, game, song, idea, photograph, or written work) or any combination thereof. In particular embodiments, data stores or verticals may store objects of a social-networking system. In particular embodiments, each data store or vertical may be configured to store objects of a particular query-domain in a respective data storage device. As an example and not by way of limitation, a first vertical may store objects associated with movies; a second vertical may store objects associated with restaurants; a third vertical may store objects associated with landmarks. In particular embodiments, each object may have filter values that are metadata or attributes that describe particular query-filters that are characteristics of an object stored on social-networking system 160. As an example and not by way of limitation, example query-filters ["Genre"], ["Cuisine"], ["Location"] may have associated example filter values ["Sci-Fi"], ["Chinese"] and ["Palo Alto"], respectively.

In particular embodiments, the search results of the suggested query returned to card-aggregator module 620 may be modified by query-filters and associated filter values identified by card-recommendation module 630. In particular embodiments, card-recommendation module 630 may identify one or more query-filters relevant to the user from a pre-determined list of query-filters associated with each domain modules $domain_1$-$domain_N$. In particular embodiments, card-recommendation module 630 may store or access information related to information from social-graph 200 of the user, features of objects (e.g. a number of "likes" associated with an object), demographic information of the user, or any combination thereof. In addition, card-recommendation module 630 may access data associated with one or more objects (e.g. hours of operation, physical locations, or event times) stored on one or more third-party systems 170 to supplement the filter values of one or more objects stored on social-networking system 160. Furthermore, card-recommendation module 630 may identify one or more query-filters and associated filter values through identification of one or more edges connecting to one or more concept or user nodes of social-graph 200 of the user. In addition, card-recommendation module 630 may identify particular query-filters and associated filter values that may be relevant to the user by accessing information stored on user-history module 640 and demographic-data module 650 in combination with the data of card-recommendation module 630. As an example and not by way of limitation, card-recommendation module 630 may access activity of "friends" of the user and identify one or more query-filters and associated filter values based on the activity of the "friends." For example, a query-filter and associated filter value may be identified based on one or more "friends" of the user "liking" a particular content object, such as for example a particular movie or multiple movies of a particular genre. As another example, card-recommendation module 630 may identify one or more query-filters and associated filter values based on the activity of other users with at least a subset of similar demographic data as the user.

In particular embodiments, demographic-data module 650 may store demographic information of user through the user profile or social graph 200 described above. Example demographic information of the user may include gender, age, hometown, location of residence, school attended, organization membership, religious affiliation, level of education, relationship status, occupation, or any combination thereof. In particular embodiments, one or more query-filters and associated filter values may be identified by card-recommendation module 630 based at least in part on identifying edges to objects in social-graph 200 of other users with similar demographic information to the user stored on demographic-data module 650. As an example and not by way of limitation, card-recommendation module 630 may identify a particular query-filter (e.g. ["Genre"]) having an associated filter value of (e.g. ["Sci-Fi"]) based on other users having at least a subset of demographic information in common with the user, such as for example having the same level of education and occupation. In particular embodiments, card-recommendation module 630 may identify one or more query-filters and filter values for a particular query-domain based at least in part on a determination of whether the user is local or a tourist to the current location. As an example and not by way of limitation, the determination of whether the user is local or tourist of the current location may be based on comparing the current location of the user to hometown or location of residence information stored by demographic-data module 650. As another example, certain demographic information, such as, for example, a user's hometown, work, school, etc., may be derived from stored historic GPS or location data of the user. For example, if location data of the user indicates the user is at Menlo Park during working hours on most days, social-networking system may infer Menlo Park is the workplace of the user. Furthermore, inferred geo-locations of user may be stored in demographic-data module 650 and used by card-recommendation module 630 even if the user does not explicitly provide this information in their user profile. As another example, location data may be extracted from photos of the user to determine a geo-location associated with the user and infer the hometown of the user.

In particular embodiments, user-history module 640 may store social-graph information that may include the user's past activity within social-networking system 160 that may be represented as an edge connecting the node of the user to other nodes of the user's social-graph 200 as described above. As an example and not by way of limitation, user-history module 640 may include a check-in history or "like" history of the user. For example, card-recommendation module 630 may identify particular query-filters (e.g. ["Cuisine"] and ["Location"] and associated filter values ["Chinese"] and ["Palo Alto"], respectively, that are relevant to the user based at least in part on the user having multiple check-ins at one or more restaurants of a particular cuisine near his place of residence. As another example, card-recommendation module 630 may identify one or more query-filters and associated filter values based at least in part on a search history of the user stored on user-history module 640. In particular embodiments, user-history module 640 may include information associated with interactions of the user with previously displayed cards 450. As described below, one or more query-filters and associated filter values may be identified as being more or less relevant to the user based at least in part on interactions or lack of interaction by the user with cards 450 referencing the query-filters and associated filter values. In particular embodiments, card-recommendation module 630 may identify one or more query-filters for a particular query-domain based at least in part on a determination of whether the user is local or a tourist to the current location. As an example and not by way of limitation, the determination of whether the user is local or tourist of the current location may be based on the "check-in" or "likes" of the user stored by user-history module 640. In particular embodiments, the determination of whether the user is a local or tourist may be based on calculating a score based on information of the user stored by user-history module 640 or demographic-data module 650 as described above.

Card-recommendation module 630 may send the identified query-filters and associated filter value of the particular query-domains of the suggested query to domain modules $domain_1$-$domain_N$. Although this disclosure describes query-domains having a particular number of query-filters having a particular number of associated filter values, this disclosure contemplates query-domains having any suitable number of query-filters and associated filter values. In particular embodiments, query-filters may remove or ignore a subset of search results returned by domain modules domain$_1$-domain$_N$ based at least in part on the identified query-filters and associated filter values. As an example and not by way of limitation, for query-filter ["Rating"] and associated filter value ["4 Stars"] of the ["Restaurant"] query-domain, one or more objects associated with the ["Restaurant"] query-domain that are returned in response to the suggested query and have a ["4 Stars"] filter value for the ["Rating"] query-filter are sent to card-aggregator module 620.

As described above, card-aggregator module 620 may generate one or more cards 450 that reference one or more objects received from domain modules domain$_1$-domain$_N$ in response to the suggested query. In particular embodiments, a user-engagement score may be calculated for each card 450 based on one or more user-engagement factors. In particular embodiments, the user-engagement factors may include one or more of social-graph information, demographic information, current information of the user, or any combination thereof. The user-engagement score may be, for example, a confidence score, a probability, a quality, a ranking, another suitable type of score, or any combination thereof. As an example and not by way of limitation, the user-engagement score for each card may represent a probability that the user will engage with the card. As another example, the user-engagement score may represent an estimate of the degree and depth of user interaction with cards 450 referencing particular objects against a clearly defined set of goals. As an example and not by way of limitation, calculating the user-engagement score may be based on previous engagement with cards 450 referencing each query-domain, previous click-thru rate of cards 450 referencing each query-domain, the conversion-rate of particular cards 450 referencing each query-domain, preferences of the user, the search history of the user, the user's social-graph affinity for social-graph elements or objects referenced by cards 450, inferring the intent of the user, the current location of the user, the general or current popularity of the query-domain of cards 450 ("trending"), other suitable factors, or any combination thereof. As an example and not by way of limitation, preferences of the user may specify, for example, suggested queries or types of suggest queries of interest or not of interest to the user. As an example and not by way of limitation, social-networking system 160 may identify cards 450 that correspond to suggested queries or reference query-domains/filters preferred by the user, as specified by a user-preference of the user, and calculate higher user-engagement scores for these cards 450 specified as being preferred by the user (similarly, cards 450 corresponding to suggested queries or suggested query-domains/filters specified as being not preferred may be scored lower or completely excluded/assigned null scores). As another example, the intent of the user may be inferred, as described below, and cards corresponding to suggested queries related to that intent may be generated and sent to the user. Although this disclosure describes calculating the user-engagement score of cards in a particular manner, this disclosure contemplates calculating the user-engagement score of cards in any suitable manner.

Social-networking system 160 may send one or more cards 450 to the user. As an example and not by way of limitation, cards 450 may be sent as one or more card clusters 530. In particular embodiments, cards 450 may be displayed on a page currently accessed by the user. As an example and not by way of limitation, the page may be a profile page of social-network system 160 (e.g., a user-profile page of the querying user or another user, or a concept-profile page of a concept associated with the online social network), a newsfeed page of the online social network, a search-results page corresponding to a particular card, or another suitable page of the online social network. In particular embodiments, each sent card 450 may have a user-engagement score greater than a user-engagement threshold for the user. After scoring cards 450, social-networking system 160 may then send only those cards 450 having a user-engagement score greater than the user-engagement threshold score. In particular embodiments, the sent cards 450 may be displayed on a newsfeed page of the online social network. In particular embodiments, cards 450 corresponding to suggested queries having a user-engagement score greater than the user-engagement threshold score may automatically be pushed to a user. As an example and not by way of limitation, the sent cards may be displayed as one or more stories in the newsfeed of the user, a notification pushed to client system 130 of the user, a suggested null-state query, or any combination thereof. Cards 450 may be generated and scored, as described previously, and rather than displaying the card in association with a search-query field 350, the card could be generated as a newsfeed store and displayed in a user's newsfeed in response to the user accessing a newsfeed page of the online social network, in a standalone application, or on a home screen of a client system.

Figure 7:
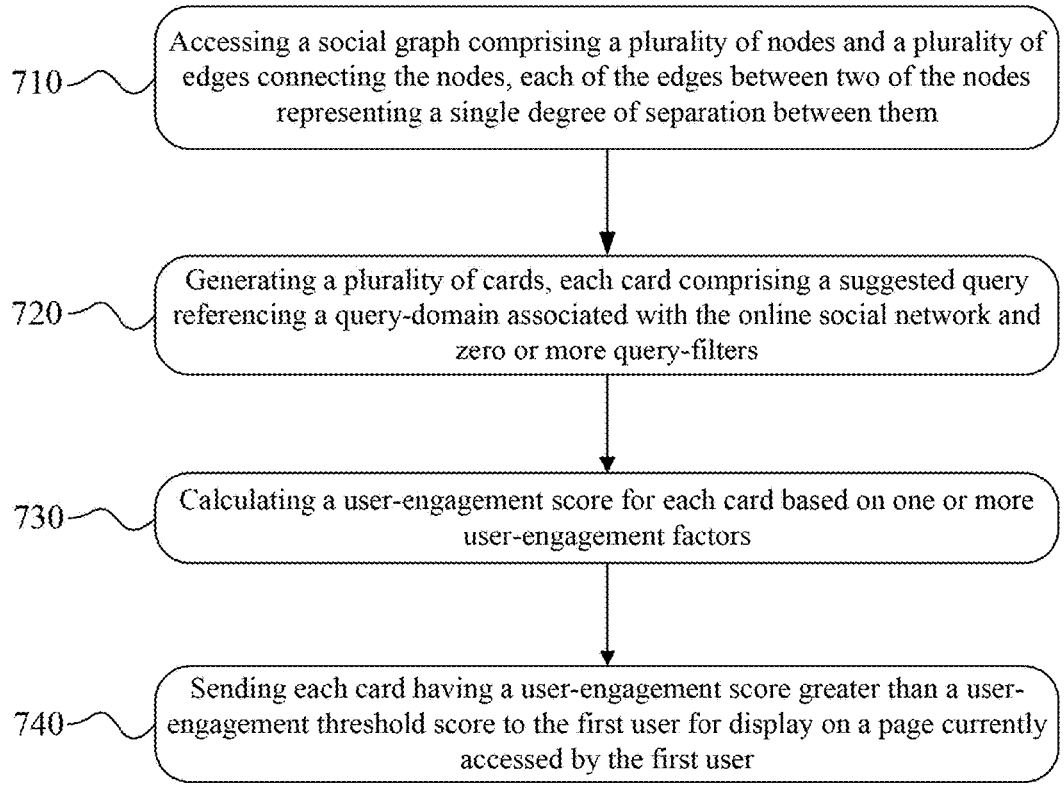
FIG. 7 illustrates an example method for generating cards for a user.

FIG. 7 illustrates an example method 700 for generating cards for a user. The method may begin at step 710, where social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 720, social-networking system 160 may generate a number of cards. In particular embodiments, each card may include a suggested query that references a query-domain associated with the online social network and zero or more query-filters. Each query-filter may reference one or more nodes of the plurality of nodes or one or more edges of the plurality of edges. At step 730, social-networking system 160 may calculate a user-engagement score for each card based on one or more user-engagement factors. At step 740, social-networking system 160 may send each card having a user-engagement score greater than a user-engagement threshold score to the first user for display on a page currently accessed by the first user. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating cards for the user including the particular steps of the method of FIG. 7, this disclosure contemplates any suitable method for generating cards for the user including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

FIG. 8 illustrates an example wireframe of an example card interface on an example mobile client system 130. As described above, social-networking system 160 may automatically generate one or more cards 450 that each includes one or more search results 550. In particular embodiments, an initial card stack may include one or more cards 450 that reference a particular query-domain and zero query-filters. Furthermore, each card 450 may correspond to a suggested query that references a query-domain associated with social-networking system 160. In particular embodiments, one or more cards 450 may correspond to a preview of one or more search results of the suggested query.

As described above, the query-domain of cards 450 may be modified by one or more query-filters. For example, a ["restaurant"] query-domain may have one or more query-filters, such as for example ["location"], ["cuisine"], or ["rating"]. In particular embodiments, cards 450 may result from a combination of the query-domain, zero or more query-filters, and zero or more filter values that may reference one or more concept nodes, user nodes, edges of social graph 200, resources or objects on social-networking system 160, or any combination thereof. As described above, the user may interact with one or more cards 450 of the displayed card cluster 530. As an example and not by way of limitation, a native application on mobile client system 130 may detect an input corresponding to a "scroll" gesture to navigate between cards 450 of card cluster 530. For example, the user may view cards 450 with different query-filters by scrolling through card cluster 530. As another example, the native application may detect an input corresponding to a "swipe" gesture on a particular card 450 to reveal options for the user to apply additional or different query-filters. In particular embodiments, detecting input corresponding to a "swipe" gesture on a particular card 450 to display a subsequent card 450 having a same query-domain and one or more different query-filters as the previously displayed card 450. As an example and not by way of limitation, the user may apply a query-filter corresponding to ["rating"] to cards 450 of card cluster 530 with query-domain ["restaurants"] and query-filter ["cuisine"]. In particular embodiments, cards 450 lower in card cluster 530 may be modified based on the interactions of the user with previously displayed cards 450 of card cluster 530. As an example and not by way of limitation, cards 450 lower down in card cluster 530 may display restaurants of a particular cuisine that additionally have a particular rating. In particular embodiments, social-networking system 160 may generate cards 450 relevant to different time periods. A particular card 450 may correspond to a search query having search results that are immediately relevant, relevant to a future time period, or relevant to any other suitable time period. Cards 450 may be ranked in part on the time period they are relevant to. As an example and not by way of limitation, based on historical application of query-filter ["dinner"], cards 450 corresponding to "Places to eat dinner tonight" may be placed higher in card cluster 530 even if the current time is only 2:00 PM, which is outside "normal" dinner hours, and thus may not be immediately relevant for several hours. As another example and not by way of limitation, based on a user's current location (e.g., as determined from the user's mobile client system 130) being out of the office, cards 450 corresponding to "Places to eat now" may be placed higher in card cluster 530 even if the current time is 2:00 PM, which may be after "normal" lunch hours, but may be considered immediately relevant based on the user's current location.

Ranking Cards with Suggested Queries

In particular embodiments, ranking of cards 450 may be based at least in part on particular query-domains, query-filters, filter values, or any combination thereof. Herein, reference to a predicted CTR ranking may refer to a probability that the user will "click through" to interact with an entity or user associated with the content of a particular card 450. As an example and not by way of limitation, social-networking system 160 may rank cards 450 using a value model described below. As another example and not by way of limitation, social-networking system 160 may rank cards 450 according to inferring a use case associated with card 450, as described below. Although this disclosure describes ranking cards in one or more particular manners, this disclosure contemplates in any suitable manner.

In particular embodiments, social-networking system 160 may rank cards 450 of a particular card cluster 530 based at least in part on a value model. As an example and not by way of limitation, the value model of ranking may be based on a predicted CTR as well as a user-interest value of the card, which my represent the user's interest, satisfaction, happiness, etc. when clicking-thru on the particular card (or performing an activity associated with the card), or may also represent an actual monetary value (e.g., advertising sponsorship) associated with interacting with the particular card. As an example and not by way of limitation, a first activity (e.g. reading an article) with a 10% click-thru rate may have an associated user-interest value of 1, representing a nominal user interest in the activity, while a second activity (e.g. buying a concert ticket) may have a CTR of 1% but a user-interest value of 100, where the second activity may be determined to make users 100-times happier (or be 100-times more interesting) to do this than the first activity. Therefore, cards 450 related to the second activity may be ranked higher than cards 450 related to the first activity, notwithstanding the second activity being associated with cards having a lower predicted CTR. In particular embodiments, the value model may be a function of the predicted CTR multiplied by a predicted conversion rate and multiplied by a user-interest value of the conversion event.

As another example, the value model of ranking may be based at least in part on social-networking system 160 calculating the predicted CTR for each card 450. Social-networking system 160 may infer cards 450 corresponding to suggested queries with higher predicted CTRs are of higher interest to the user. For example, social-networking system 160 may calculate the predicted CTR based at least in part on factors, such as for example time of day, day of the week, current location of the user, CTRs of other users with similar demographic data, a calculated CTR for the user with respect to particular query-domains/query-filters, social-graph affinity, or any combination thereof. In particular embodiments, social-networking system 160 may calculate the predicted CTR for each card 450 based at least in part on preferences of the user. As an example and not by way of limitation, one of more user-preferences may be specified by the user, other users (e.g., parents or employers of the user), system administrators, third-party systems 170, or otherwise determined by social-networking system 160.

In particular embodiments, social-networking system 160 may calculate the predicted CTR for each card 450 based at least in part on a search history users of the social network. As an example and not by way of limitation, cards 450 that reference social-graph objects (or types of objects) that the user has previously accessed (or been accessed by other users that are relevant to the user, such as "friends" of the user), or are relevant to the social-graph objects the user has previously accessed, may be more likely to be of interest to the user. Thus, these cards 450 may be scored more highly. As an example and not by way of limitation, if user has previously visited the "Stanford University" profile page and has a current location of Palo Alto, social-networking system 160 may determine that a particular card 450 that references the concept node 204 for "Stanford University" has a relatively high CTR based at least in part on the user has previously accessed the concept node 204 for the university. As another example, if the user has previously interacted with search results associated with particular query-domains, and not interacted with search results associated with other query-domains, then social-networking system 160 may score the predicted CTR of cards 450 referencing query-domains previously interacted with by the user higher than other cards 450 referencing other query-domains not previously interacted with.

In particular embodiments, social-networking system 160 may calculate the predicted CTR for each card 450 based at least in part on a social-graph affinity of the user node 202 corresponding to the user with respect to one or more of the nodes referenced in one or more cards 450. Cards 450 that reference nodes having relatively high social-graph affinity (e.g., a high affinity coefficient) with respect to the user may be more likely to be of interest to the user. Thus, these cards 450 may have a higher predicted CTR. As an example and not by way of limitation, social-networking system 160 may calculate the predicted CTR of cards 450 based at least in part on a degree of separation (which may be one measure of affinity) between the user node 202 of the user and the particular social-graph objects referenced in the respective card 450. Cards 450 that reference social-graph objects that are closer in social graph 200 to the user (e.g., fewer degrees of separation between the object and user node 202 of the user) may have a higher predicted CTR than cards 450 that reference social-graph objects that are further from the user (e.g., more degrees of separation). Although this disclosure describes calculating a predicted CTR in a particular manner, this disclosure contemplates calculating the predicted CTR in any suitable manner.

In particular embodiments, social-networking system 160 may calculate the predicted CTR for each card 450 based at least in part on determining a trend in regard to a particular query-domain or filter values of the suggested query of cards 450. Furthermore, social-networking system 160 may calculate trending query-domains or query-filters based on the activity of all users on social-networking system 160. As an example and not by way of limitation, social-networking system 160 may determine a particular query-domain (e.g. ["Restaurants"]) is trending when there is an increase in activity, such as for example "check-ins" or "likes," associated with one or more concept nodes corresponding to restaurants over a relatively short period of time. Furthermore, social-networking system 160 may determine a particular filter-value (e.g. ["Chinese"]) associated with a particular query-filter (e.g. ["Cuisine"]) is trending when there is an increase in activity, such as for example "check-ins", comments, or "likes," associated with concept nodes corresponding to Chinese restaurants over a relatively short period of time. In particular embodiments, cards 450 that reference objects corresponding to trending query-domains or filter values associated with query-filters may have a higher predicted CTR than cards 450 that reference objects that are not trending.

In particular embodiments, social-networking system 160 may rank cards 450 based at least in part on inferring a use case associated with each card 450. Furthermore, inferring the use case of the user may be based at least in part on the user history of the user or other users with similar demographic information as the user. In particular embodiments, the inferred intent(s) of the user may correspond to particular suggested queries or query-domain/filters, and cards 450 corresponding to suggested queries matching the inferred intent of the user may have a higher ranking. In particular embodiments, social-networking system 160 may infer the intent of the user based on a variety of factors, such as for example, the time of day, the proximity of the user to other users or objects, social-graph information, social-graph affinity, the search history of the user, feedback from the user, the geographic location of the user, other relevant information about the user, or any combination thereof. As an example and not by way of limitation, social-networking system 160 may infer the user is interested in finding a restaurant based on the time of day and information, such as for example user-history, of the user. For example, social-networking system 160 may rank cards 450 referencing restaurants more highly at a particular time frame based at least in part on the user frequently checking-in at restaurants at the particular time of day. As another example, social-networking system 160 may rank particular cards 450 more highly based on the particular day of the week and information, such as for example user-history, of the user. For example, social-networking system 160 may rank cards 450 referencing ["Movies"] more highly on a particular day of the week (e.g. Friday) based at least in part on the user history (e.g. "check-ins") with respect to movie theaters on the particular day of the week. More information on determining the intent of a user may be found in U.S. patent application Ser. No. 13/776,469, filed 25 Feb. 2013, which is incorporated by reference. Although this disclosure describes inferring the intent of a user in a particular manner, this disclosure contemplates inferring the intent of the user in any suitable manner.

Figure 9:
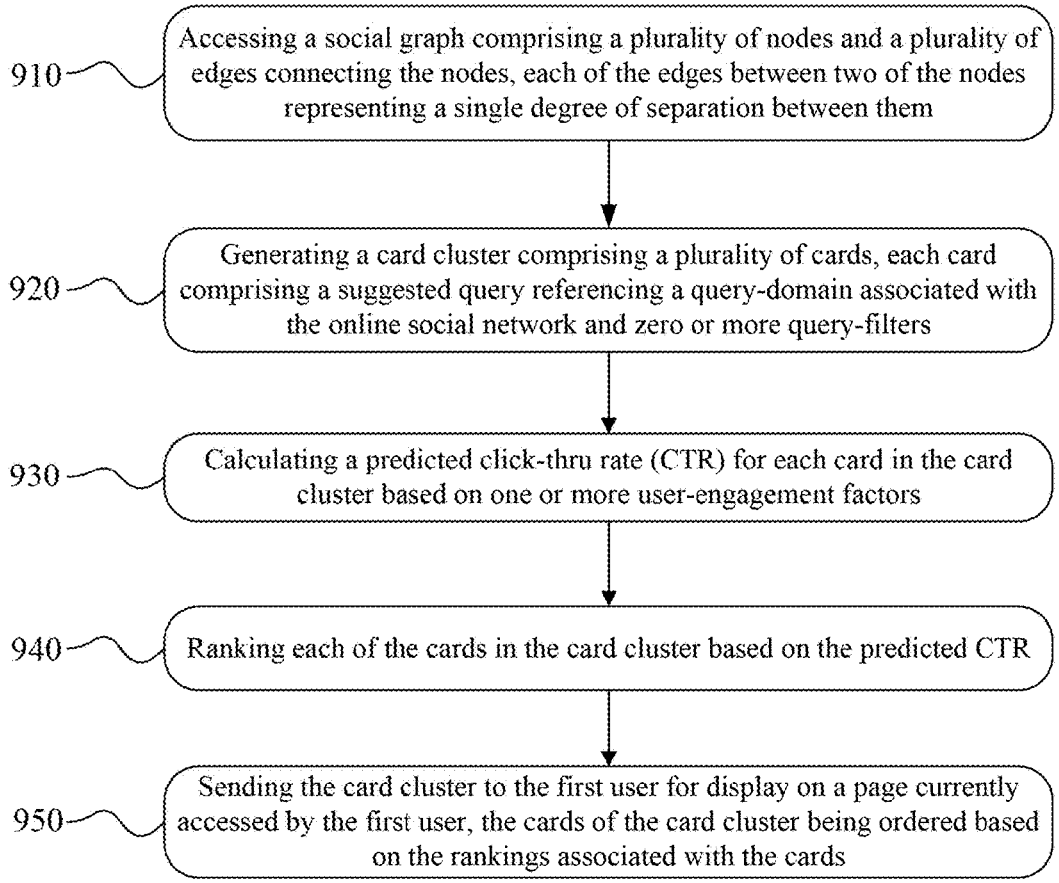
FIG. 9 illustrates an example method for ranking cards.

FIG. 9 illustrates an example method 900 for ranking cards. The method may begin at step 910, where social-networking system 160 may access a social graph 200 comprising a plurality of nodes and a plurality of edges 206 connecting the nodes. The nodes may comprise a first user node 202 and a plurality of second nodes (one or more user nodes 202, concept nodes 204, or any combination thereof). At step 920, social-networking system 160 may generate a card cluster that includes a number of cards. In particular embodiments, each card corresponds to a suggested query that references a query-domain associated with the online social network and zero or more query-filters. In particular embodiments, each query-filter references one or more nodes or one or more edges. At step 930, social-networking system 160 may calculate a predicted CTR for each card in the card cluster based on one or more user-engagement factors. At step 940, social-networking system 160 may rank each of the cards in the card cluster based on the predicted CTR. At step 950, social-networking system 160 may send the card cluster to the first user for display on a page currently accessed by the first user. In particular embodiments, the cards of the card cluster may be ordered based on the ranking associated with the cards. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for ranking cards including the particular steps of the method of FIG. 9, this disclosure contemplates any suitable method for ranking cards including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
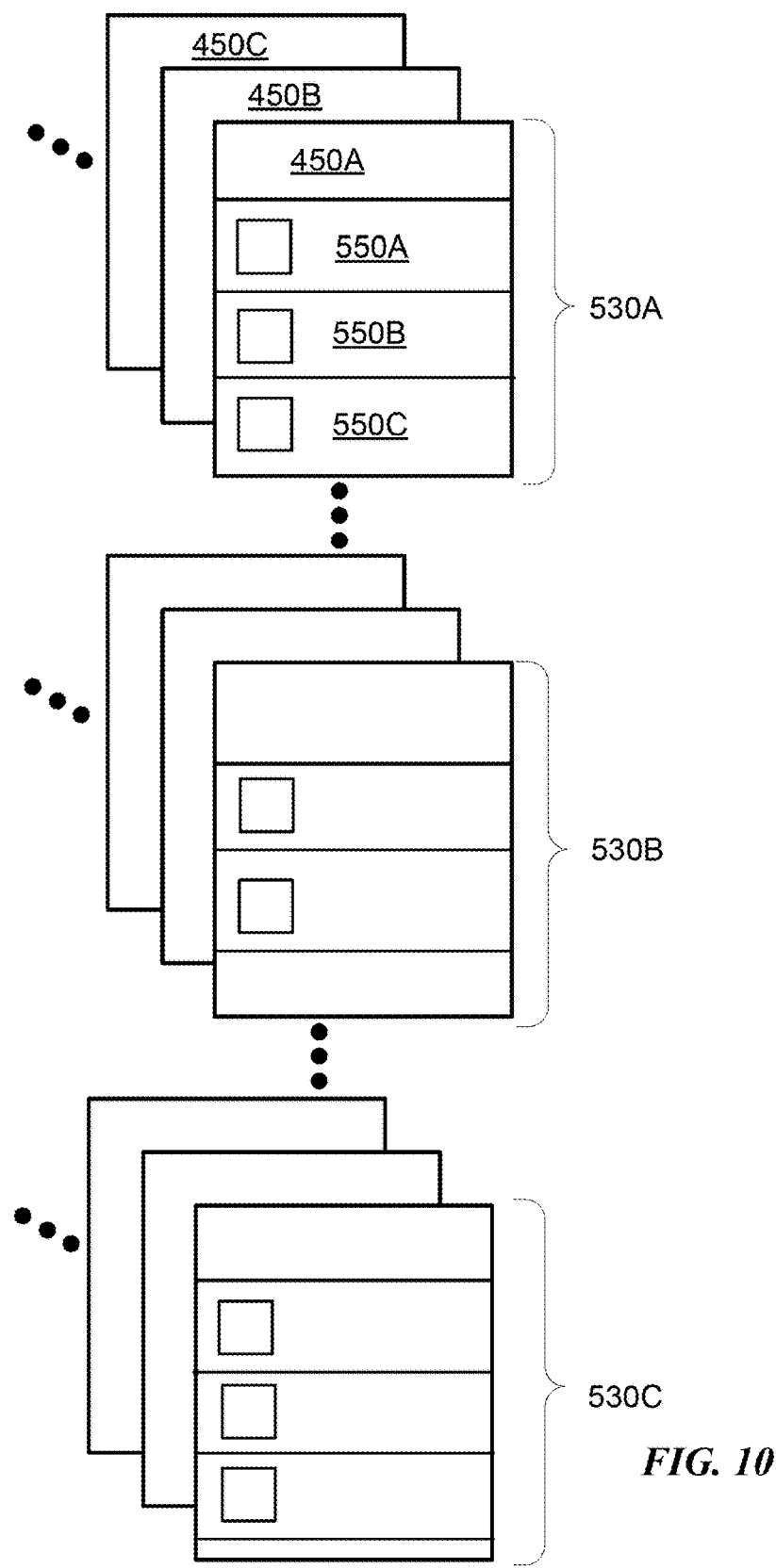
FIG. 10 illustrates an example grouping of example card clusters.

FIG. 10 illustrates an example grouping of example card clusters 530. Although FIG. 10 illustrates a particular configuration of card clusters 530 with a particular configuration of cards, this disclosure contemplates any suitable configuration of card cluster with any suitable configuration of cards. In particular embodiments, social-networking system 160 may rank cards 450 (each card 450 showing one or more search results 550) of a plurality of card cluster 530, and rank each card cluster 530, such that the most interesting cards 450 are presented to the user. As illustrated in the example of FIG. 10, card clusters 530A-C may be displayed in a vertical arrangement on a UI or page. As described above, each card cluster 530 may reference a particular query-domain and zero or more query-filters. In particular embodiments, card clusters 530A-C may be ranked from highest to lowest inferred relevance to the user, as described below, and displayed in descending order. As an example and not by way of limitation, a first card cluster 530A may include cards 450 that reference the ["Restaurant"] query-domain, a second card cluster 530B may include cards 450 that reference the ["Movie"] query-domain, and a third card cluster 530C may include cards 450 that reference the ["Landmarks"] query-domain. In particular embodiments, the user may navigate between card clusters 530A-C by performing a "scroll" touch gesture.

As illustrated in the example of FIG. 10, card cluster 530A (which includes cards 450A-C) referencing a particular query-domain with different query-filters may be arranged in a horizontal arrangement. In particular embodiments, scrolling horizontally through card cluster 530A navigates between cards 450A-C with cards 450 referencing the same query-domain and different filter values. As an example and not by of limitation, card clusters 530A may include cards that each reference the ["Restaurant"] query-domain and different query-filters. For example, a first card 450A may reference the query-filter ["Cuisine"], a second card 450B may reference the query-filter ["Rating"], and a third card 450C may reference the query-filter ["Location"]. As another example, card cluster 530A may include cards 450 that each reference the ["Restaurant"] query-domain and the ["Cuisine"] query-filter having different filter values. For example, a first card 450A may reference the filter value ["Chinese"], a second card 450B may reference the filter value ["Indian"], and a third card 450C my reference the filter value ["Ethiopian"].

In particular embodiments, social-networking system 160 may rank card clusters 530 based at least in part on the predicted CTR of cards 450 of each card cluster 530. Furthermore, cards 450 in card clusters 530 may be ranked on a similar basis. As an example and not by way of limitation, social-networking system 160 may rank each card cluster 530A-C based at least in part on value of the predicted CTR of card 450 that has the highest predicted CTR of each card cluster 530A-C. For example, a first card cluster 530A may include cards 450 that reference the ["Restaurant"] query-domain, a second card cluster 530B may include cards 450 that reference the ["Movie"] query-domain, and a third card cluster 530C may include cards 450 that reference the ["Landmarks"] query-domain, based on a ranking of card 450 that has the highest predicted CTR for each card cluster 530A-C. As another example, social-networking system 160 may rank card clusters 530 based at least in part on the average CTR of all cards of the particular query-domain. As another example, card cluster 530A-C of each query-domain may be ranked on a weighted average of the predicted CTR of cards 450 of the particular query-domain. In particular embodiment, lower predicted CTR value cards 450 may be added to card cluster 530 for a smoother transitions between cards 450 of one or more card clusters 530. Although this disclosure describes ranking of card clusters of query-domains in a particular manner, this disclosure contemplates ranking of card clusters of query-domains in any suitable manner.

Grouping Cards with Suggested Queries

In particular embodiments, social-networking system 160 may group cards 450 into card clusters 530. Cards 450 may be grouped into card clusters 530 based on a calculated card-affinity with respect to each card 450. Herein, reference to a card-affinity may refer to a metric to represent the strength of a relationship between two or more cards 450. Herein, reference to a card-affinity threshold may refer to a minimum value of card-affinity between cards 450 grouped into a card cluster 530. As an example and not by way of limitation, social-networking system 160 may generate one or more card clusters 530 based calculating a card affinity based at least in part on query-domains or query-filters of cards 450. As another example, social-networking system 160 may propagate one or more query-filters to subsequent cards 450 of a card cluster 530 based on a user interaction. Although this disclosure describes generating card clusters in a particular manner, this disclosure contemplates generating card clusters in any suitable manner.

In particular embodiments, social-networking system 160 may consider one or more affinities when calculating the card-affinity of cards 450 with respect to the other cards 450. Example affinities that may be used to calculate the card-affinity may include query-domain to query-domain, query-filter to query-filter, filter value to filter value to filter value, or any combination thereof. As an example and not by way of limitation, social-networking system 160 may calculate the card affinity based at least in part on signals provided by substantially all users of social-networking system 160. As another example, social-networking system 160 may calculate the card affinity based at least in part on features of objects, social-graph affinity of the user, demographic information of the user, activities of "friends", or any combination thereof. Although this disclosure describes calculating a card affinity in a particular manner, this disclosure contemplates card affinity in any suitable manner.

In particular embodiments, social-networking system 160 may calculate the card-affinity based at least in part on calculating an affinity of cards corresponding to the different query-domain and same query-filters or associated filter values. As an example and not by way of limitation, social-networking system 160 may determine cards 450 corresponding to the ["Books"], ["TV Shows"], and ["Movies"] query-domains have a high affinity to each other in the ["Genre"] query-filter and ["Sci-Fi"] filter value based at least in part on the activity of other users of social-networking system 160, that have at least some overlapping demographic data as the user, with respect to objects corresponding to the ["Genre"] query-filter and ["Sci-Fi"] filter value.

In particular embodiments, social-networking system 160 may calculate the card-affinity based at least in part on calculating an affinity of cards corresponding to the same query-domain and different query-filters or associated filter values. As an example and not by way of limitation, social-networking system 160 may determine cards 450 corresponding to the ["Cuisine"] query-filter have a high affinity to each other in the ["Restaurant"] query-domain based at least in part on the user history of the user on social-networking system 160 with respect to objects referencing the ["Cuisine"] query-filter, such as for example, the user "liking" or "checking-in,=" at restaurants of a particular cuisine. As another example, social-networking system 160 may calculate cards 450 corresponding to the ["Rating"] query-filter have a high affinity to each other in the ["Restaurant"] query-domain based at least in part on the user history of the user on social-networking system 160 with respect to objects corresponding to the ["Rating"] query-filter, such as for example, the "liking" or "checking-in" at restaurants of a particular rating.

In particular embodiments, social-networking system 160 may update the card affinity calculations based at least in part on user interactions with cards 450. As described above, social-networking system 160 may modify one or more cards 450 of a card cluster 530 based on user interactions with displayed cards 450 of card cluster 530. As an example and not by way of limitation, social-networking system 160 may apply a particular query-filter and associated filter values to cards 450 based on interactions of the user. For example, a first card cluster 530A may include cards 450 that reference the ["Restaurant"] query-domain with query-filter ["Rating"] and associated filter value ["4 Star"], such that the first card cluster 530A includes cards that reference 4 star restaurants with any type of cuisine. A second card cluster 530B may include cards 450 that reference the ["Restaurant"] query-domain with query-filter ["Rating"] and associated filter value ["3 Star"]. Furthermore, if the user selects, such as for example by swiping a card 450 of first card cluster 530A, referencing a particular filter value (e.g. ["Chinese"]) for a particular query-filter (e.g. ["Cuisine"]), then subsequent cards 450 of first card cluster 530A may be modified to reference Chinese restaurants with a 4-star rating and the cards of the second card cluster 530B may be modified to reference Chinese restaurants with a 3-star rating. In particular embodiments, social-networking system 160 may apply one or more previously selected query-filters or filter values to card cluster 530 that are displayed at a later time. As an example and not by way of limitation, based on the user history of the user interacting with cards 450 referencing a particular query-filter (e.g. ["Cuisine"]), social-networking system 160 may calculate a higher card-affinity for cards 450 with the same cuisine. Furthermore, subsequent card clusters 530 may be automatically include cards 450 grouped by the query-filter (e.g. ["Cuisine"]). Although this disclosure describes modifying the card-affinity in a particular manner, this disclosure contemplates modifying the card-affinity in any suitable manner.

Figure 11:
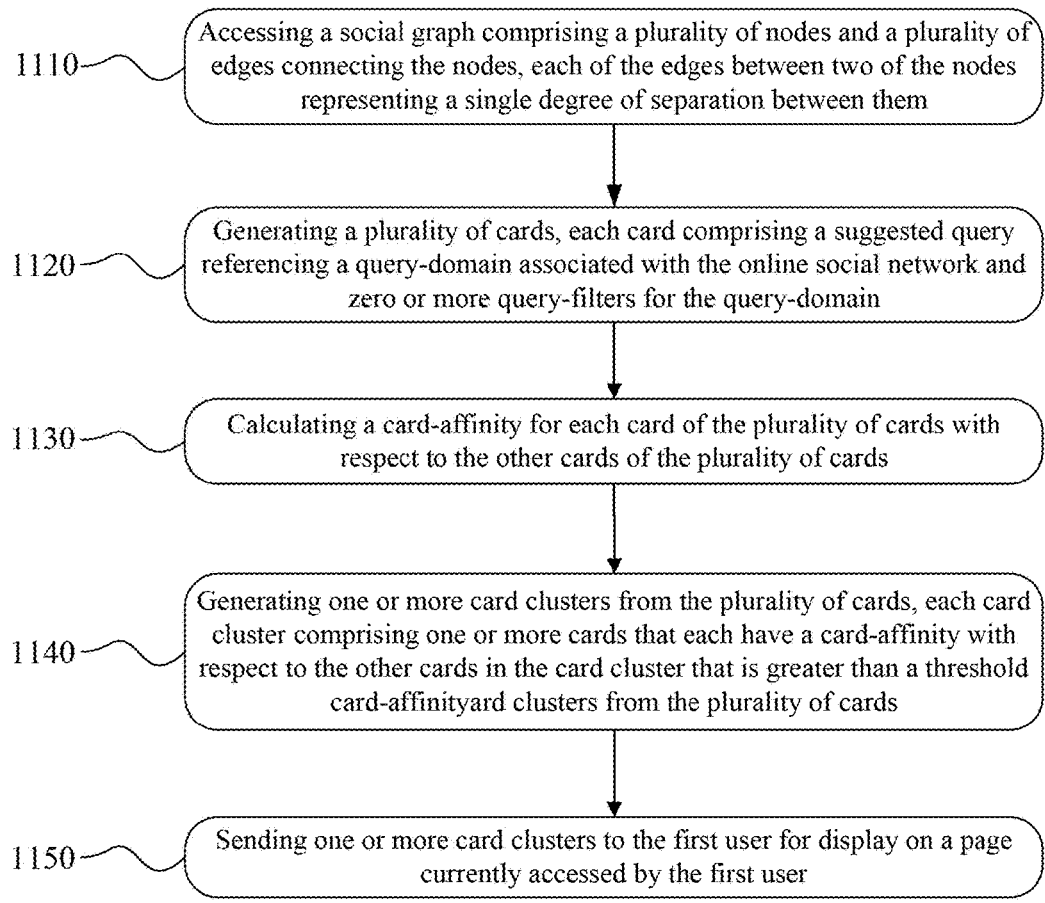
FIG. 11 illustrates an example method for generating a card cluster.

FIG. 11 illustrates an example method 1100 for generating a card cluster. The method may begin at step 1110, where social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 1120, social-networking system 160 may generate a number of cards. In particular embodiments, each card may include a suggested query that references a query-domain associated with the online social network and zero or more query-filters for the query-domain. In particular embodiments, each query-filter may reference one or more nodes or one or more edges. At step 1130, social-networking system 160 may calculate a card-affinity for each card of the plurality of cards with respect to the other cards of the plurality of cards. At step 1140, social-networking system 160 may generate one or more card clusters from the plurality of cards, each card cluster may include one or more cards that each have a card-affinity with respect to the other cards in the card cluster that is greater than a threshold card-affinity. At step 1150, social-networking system 160 may send one or more card clusters to the first user for display on a page currently accessed by the first user. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating a card cluster including the particular steps of the method of FIG. 11, this disclosure contemplates any suitable method for generating a card cluster including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action (or may be used as an input to calculate such a probability). In this way, a user's future actions may be predicted based on the user's prior actions, where the coefficient may be calculated at least in part on a history of the user's actions. This predicted probability represented by the coefficient may be different than the probabilities used to score search queries or cards discussed previously, may be used as a factor in calculating those probabilities, or may be directly used for those probabilities, as appropriate. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user. In particular embodiments, the coefficient of a user towards one or more objects may be based on the geographic proximity of the objects (e.g., to the user and/or each other) and the user's interactions with the objects. As an example and not by way of limitation, a pair of geo-locations that are sequentially visited by the user, such as for example, a restaurant and a nearby movie theater may be considered to be of more interest to each other than unrelated geo-locations.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more pages, in one or more e-mails, or in connection with search results requested by a user). In addition or as an alternative, an advertisement may be one or more sponsored stories (e.g. a newsfeed or ticker item on social-networking system 160), or may be one or more sponsored queries (e.g., a suggested query referencing a particular object). A sponsored story or query may include a reference to a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted.

In particular embodiments, an advertisement may be requested for display within social-networking-system pages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user. As an example and not by way of limitation, advertisements may be included among the search results of a search-results page, where sponsored content is promoted over non-sponsored content. As another example and not by way of limitation, advertisements may be included among suggested search queries, where suggested queries that reference the advertiser or its content/products may be promoted over non-sponsored queries.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement. As an example and not by way of limitation, a particular place or object that an advertiser wants to promote may be boosted or promoted inside a card 450 of card cluster 530 or as a single item card 450 for the user in their ranked cards. A ranking of promoted card 450 may take into account a dynamic auction to offset the engagement "hit" incurred for displaying another card 450 that is potentially less engaging to users. As another example, a sponsored card 450, not just a sponsored item may be displayed to the user. For example, a NETFLIX card 450 may correspond to only content available on NETFLIX or a STARBUCKS card 450 may be a "Starbucks Nearby" card 450 that may be displayed ahead of cards 450 corresponding to "Cafes Nearby."

Systems and Methods

Figure 12:
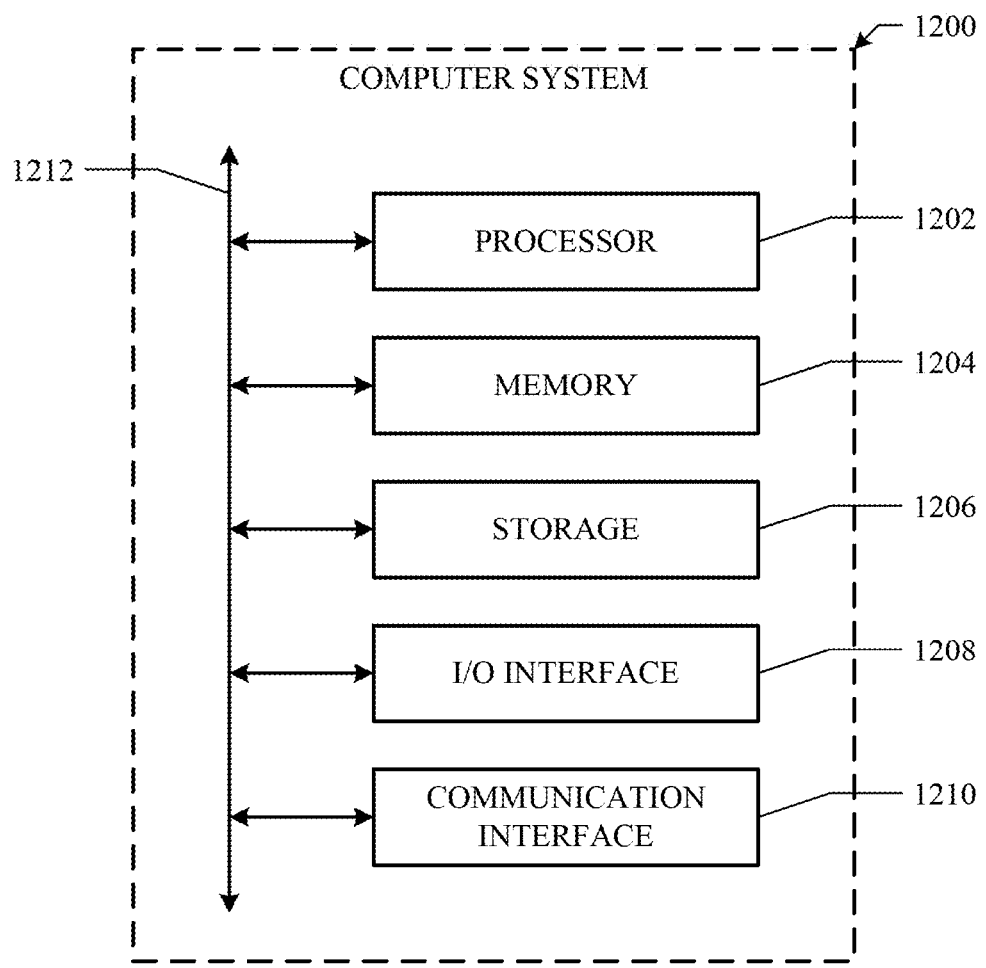
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
receiving, from a client system of a first user of a communication network, an input from the first user to access a card-stack interface;
generating one or more card clusters from a plurality of cards, each card comprising a query referencing a query-domain associated with the communication network and zero or more query-filters for the query-domain, wherein each query-filter references one or more objects of the communication network, each card cluster comprising one or more cards from the plurality of cards, the cards being formed into card clusters based on a card-affinity between the cards; and
sending, to the client system in response to the input from the first user, the card-stack interface for display to the first user, wherein the card-stack interface comprises one or more of the card clusters.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes that each correspond to a concept or a second user associated with the communication network.

3. The method of claim 1, further comprising:
generating the plurality of cards; and
calculating a card-affinity for each card of the plurality of cards with respect to the other cards of the plurality of cards, wherein each card cluster comprises one or more cards that each have a card-affinity with respect to the other cards in the card cluster that is greater than a threshold card-affinity.

4. The method of claim 3, wherein the card-affinity is calculated at least in part based on the query-domain of each card.

5. The method of claim 3, wherein the card-affinity is calculated at least in part based on the one or more query-filters of the card.

6. The method of claim 3, further comprising updating the card-affinity of one or more subsequent cards of the card cluster based on a current action of the first user in relation to a currently displayed card.

7. The method of claim 1, further comprising modifying one or more of the query-filters of one or more cards of the card cluster based on previous actions of the first user in relation to one or more of the cards.

8. The method of claim 7, further comprising modifying one or more cards of the card cluster sent to the first user based on the modified query-filters.

9. The method of claim 1, further comprising modifying the order of one or more subsequent cards of the card cluster based on actions of the first user with respect to one or more previously displayed cards.

10. The method of claim 1, further comprising calculating a user-engagement score for each card in each card cluster based on one or more user-engagement factors, wherein the user-engagement score of each card in each card cluster is above a threshold user-engagement score.

11. The method of claim 10, wherein one or more of the user-engagement factors comprise one or more of demographic information, current information, or social-graph information of the first user.

12. The method of claim 1, further comprising displaying a subsequent card to the first user in response to detecting an input from the first user corresponding to a swipe of a previously displayed card, the subsequent card having a same query-domain and one or more different query-filters as the previously displayed card.

13. The method of claim 1, further comprising displaying a subsequent card of the card cluster to the first user in response to detecting an input from the first user corresponding to a swipe of a previously displayed card, the subsequent card having a same query-domain and one or more different query-filters as the previously displayed card.

14. The method of claim 1, wherein, for each card cluster, each card corresponds to a query referencing a particular query-domain and a different query-filter.

15. The method of claim 1, wherein, for each card cluster, each card corresponds to a query referencing a particular query-filter and a different query-domain.

16. The method of claim 1, wherein the card cluster is displayed in the card-stack interface as a stack of cards.

17. The method of claim 1, wherein the card-stack interface is a user interface of a native application or a webpage accessed by a browser client.

18. The method of claim 1, wherein the communication network is an online social network.

19. One or more computer-readable non-transitory storage media embodying software that is operable when executed to:
receive, from a client system of a first user of a communication network, an input from the first user to access a card-stack interface;
generate one or more card clusters from a plurality of cards, each card comprising a query referencing a query-domain associated with the communication network and zero or more query-filters for the query-domain, wherein each query-filter references one or more objects of the communication network, each card cluster comprising one or more cards from the plurality of cards, the cards being formed into card clusters based on a card-affinity between the cards; and
send, to the client system in response to the input from the first user, the card-stack interface for display to the first user, wherein the card-stack interface comprises one or more of the card clusters.

20. A system comprising: one or more processors; and a memory coupled to the processors comprising instructions executable by the processors, the processors operable when executing the instructions to:
receive, from a client system of a first user of a communication network, an input from the first user to access a card-stack interface;
generate one or more card clusters from a plurality of cards, each card comprising a query referencing a query-domain associated with the communication network and zero or more query-filters for the query-domain, wherein each query-filter references one or more objects of the communication network, each card cluster comprising one or more cards from the plurality of cards, the cards being formed into card clusters based on a card-affinity between the cards; and
send, to the client system in response to the input from the first user, the card-stack interface for display to the first user, wherein the card-stack interface comprises one or more of the card clusters.

* * * * *